(12) United States Patent
Nakao et al.

(10) Patent No.: US 9,191,171 B2
(45) Date of Patent: Nov. 17, 2015

(54) TERMINAL APPARATUS AND RESPONSE SIGNAL TRANSMITTING METHOD

(75) Inventors: Seigo Nakao, Kanagawa (JP); Akihiko Nishio, Kanagawa (JP); Ayako Horiuchi, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 310 days.

(21) Appl. No.: 13/638,838

(22) PCT Filed: Apr. 1, 2011

(86) PCT No.: PCT/JP2011/001985
§ 371 (c)(1),
(2), (4) Date: Oct. 1, 2012

(87) PCT Pub. No.: WO2011/125320
PCT Pub. Date: Oct. 13, 2011

(65) Prior Publication Data
US 2013/0021920 A1   Jan. 24, 2013

(30) Foreign Application Priority Data
Apr. 5, 2010 (JP) ................... 2010-087088

(51) Int. Cl.
| H04W 72/04 | (2009.01) |
| H04L 5/00 | (2006.01) |
| H04L 1/00 | (2006.01) |
| H04L 1/16 | (2006.01) |
| H04L 1/18 | (2006.01) |
| H04W 24/04 | (2009.01) |
| H04L 1/14 | (2006.01) |

(52) U.S. Cl.
CPC ............ *H04L 5/0053* (2013.01); *H04L 1/0027* (2013.01); *H04L 1/0029* (2013.01); *H04L 1/1621* (2013.01); *H04L 1/1861* (2013.01)

(58) Field of Classification Search
None
See application file for complete search history.

(56) References Cited

U.S. PATENT DOCUMENTS

2011/0141878 A1*  6/2011  Che et al. ............ 370/216
2012/0057487 A1*  3/2012  Ahn et al. ........... 370/252

OTHER PUBLICATIONS

3GPP TS 36.211 V8.6.0, "Physical Channels and Modulation (Release 8)," Mar. 2009.
3GPP TS 36.212 V8.6.0, "Multiplexing and channel coding (Release 8)," Mar. 2009.
3GPP TS 36.213 V8.6.0, "Physical layer procedures (Release 8)," Mar. 2009.

(Continued)

*Primary Examiner* — Ayaz Sheikh
*Assistant Examiner* — Sori Aga
(74) *Attorney, Agent, or Firm* — Pearne & Gordon LLP

(57) ABSTRACT

Disclosed are a terminal apparatus and a response signal transmitting method that can reduce the signaling overheads related to a bundling group in a communication system to which a partial bundling is applied. In a terminal (200), a bundling control unit (212), which serves as a generating means for generating a response signal, generates, based on a bundling rule according to which bundling groups are associated with downstream unit bands constituting unit band groups, a bundle of ACK/NACK signals obtained by bundling the error detection results of active downstream unit bands included in the same bundling group, out of active downstream unit band groups constituted by active downstream unit bands.

10 Claims, 16 Drawing Sheets

(56) References Cited

OTHER PUBLICATIONS

International Search Report for PCT/JP2011/001985 dated Apr. 26, 2011.

Catt, UL ACK/NACK transmission scheme for LTE-A, R1-094542, 3GPP, Nov. 9, 2009.

Catt, Multi-channel Transmission for UL ACK/NACK in LTE-A, 3GPP TSG R AN WG1 meeting #59bis, R1-100013, Jan. 18, 2010.

\* cited by examiner

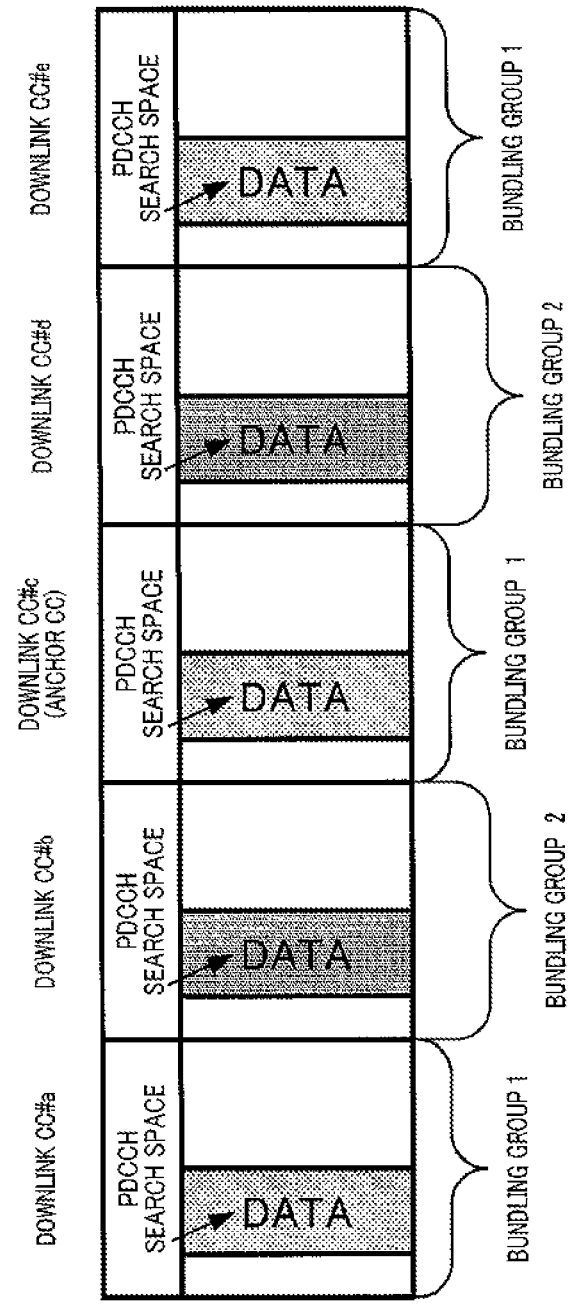

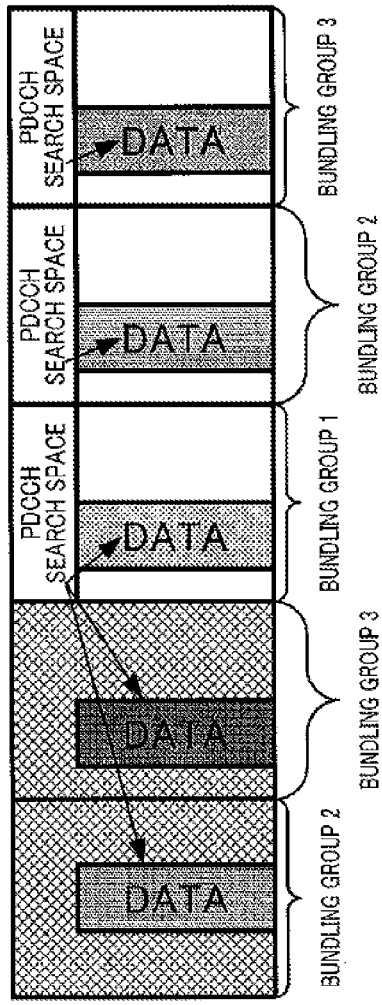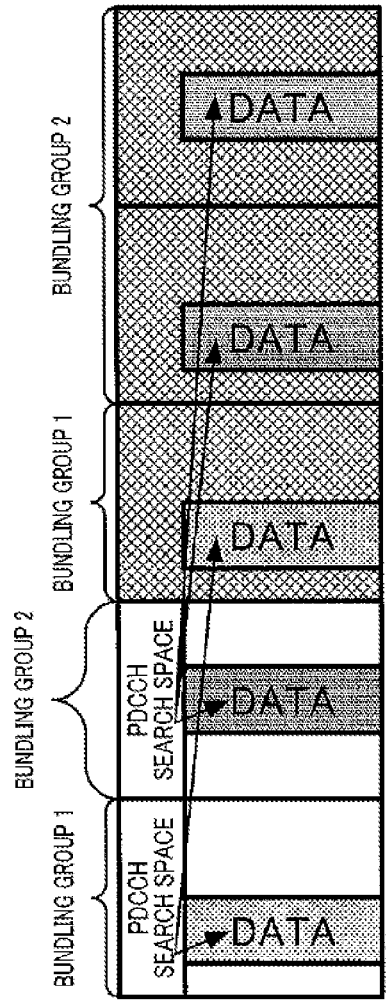

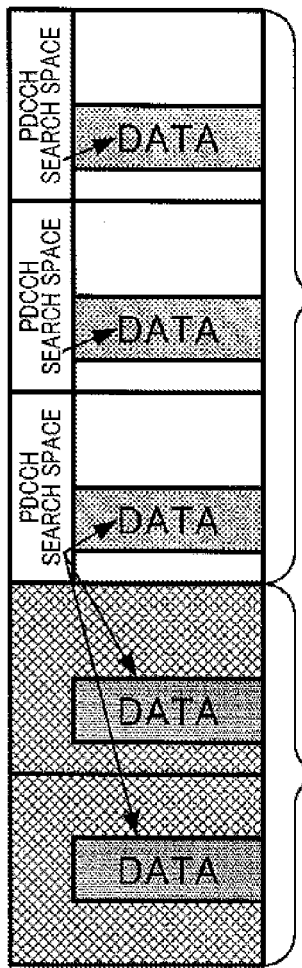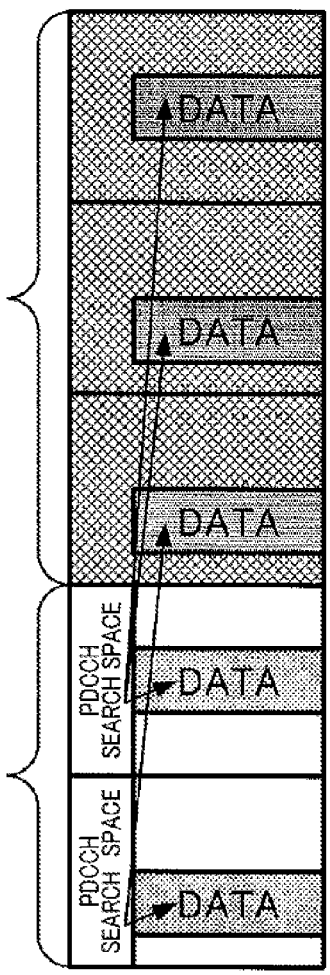

TERMINAL APPARATUS AND RESPONSE SIGNAL TRANSMITTING METHOD

TECHNICAL FIELD

The present invention relates to a terminal device and a response signal transmission method.

BACKGROUND ART

3GPP long term evolution (LTE) adopts orthogonal frequency division multiple access (OFDMA) as a downlink communication scheme. In a radio communication system to which 3GPP LTE is applied, a base station transmits a synchronization signal (synchronization channel: SCH) and a broadcast signal (broadcast channel: BCH) using predetermined communication resources. A terminal first secures synchronization with the base station by catching an SCH. Then, the terminal acquires parameters (e.g. frequency bandwidth) specific to the base station by reading BCH information (see Non-Patent Literatures 1, 2, and 3).

Furthermore, after completing the acquisition of the parameters specific to the base station, the terminal transmits a connection request to the base station and establishes communication with the base station. The base station transmits control information to the terminal with which communication is established through physical downlink control channel (PDCCH) as necessary.

The terminal then makes a "blind decision" on each of a plurality of pieces of control information included in the received PDCCH signal. That is, the control information includes a cyclic redundancy check (CRC) portion, and this CRC portion is masked with a terminal ID of a transmission target terminal in the base station. Therefore, the terminal cannot decide whether or not the control information is directed to its own terminal until the CRC portion of the received control information is demasked with the terminal ID of its own terminal. In the blind decision, when a demasking result represents that a CRC calculation is OK, it is determined that the control information is directed to its own terminal.

Furthermore, in 3GPP LTE, automatic repeat request (ARQ) is applied to downlink data from a base station to a terminal. That is, the terminal feeds back a response signal indicating an error detection result of downlink data to the base station. The terminal performs a CRC on the downlink data, and feeds back acknowledgment (ACK) when CRC=OK (no error) and negative acknowledgment (NACK) when CRC=NG (error) to the base station as a response signal. An uplink control channel such as a physical uplink control channel (PUCCH) is used for feedback of the response signal (that is, ACK/NACK signal).

However, since each terminal makes a blind decision on downlink assignment control information directed to its own terminal in each subframe (transmission unit time), the terminal is not always successful in receiving downlink assignment control information. When the terminal fails to receive downlink assignment control information directed to its own terminal in a certain downlink unit band, the terminal even cannot know whether or not downlink data directed to its own terminal exists in the downlink unit band. Therefore, when the terminal fails to receive downlink assignment control information in a certain downlink unit band, the terminal does not generate any response signal to the downlink data in the downlink unit band either. This error case is defined as DTX (discontinuous transmission) of ACK/NACK signals) of the response signal in the sense that transmission of the response signal is not performed on the terminal side.

Here, the control information transmitted from the base station includes resource assignment information including resource information and the like assigned from the base station to the terminal. The PDCCH is used for transmission of this control information as described above. The PDCCH is configured with one or more L1/L2 control channels (L1/L2 CCHs). Each L1/L2 CCH is configured with one or more control channel elements (CCEs). That is, a CCE is a base unit for mapping control information to a PDCCH. Furthermore, when one L1/L2 CCH is configured with a plurality of CCEs, a plurality of consecutive CCEs are assigned to the L1/L2 CCH. The base station assigns an L1/L2 CCH to a resource assignment target terminal according to the number of CCEs necessary for reporting control information to the resource assignment target terminal. The base station then transmits the control information mapped to a physical resource corresponding to the CCE of the L1/L2 CCH.

Here, each CCE has a one-to-one correspondence with a component resource of the PUCCH. Therefore, the terminal that has received the L1/L2 CCH can implicitly specify a component resource of the PUCCH corresponding to the CCEs configuring the L1/L2 CCH, and transmits a response signal to the base station using the specified resource. This allows downlink communication resources to be used efficiently.

As illustrated in FIG. 1, a plurality of response signals transmitted from a plurality of terminals are spread by a Zero Auto-correlation (ZAC) sequence having a Zero Auto-correlation characteristic, a Walsh sequence, and a discrete Fourier transform (DFT) sequence on a time axis, and code-multiplexed within the PUCCH. In FIG. 1, ($W_0$, $W_1$, $W_2$, $W_3$) represents a Walsh sequence having a sequence length of 4, and ($F_0$, $F_1$, $F_2$) represents a DFT sequence having a sequence length of 3. As illustrated in FIG. 1, in the terminal, a response signal of ACK or NACK is first primary-spread within one SC-FDMA symbol on a frequency axis by a ZAC sequence (having a sequence length of 12). Next, the response signal subjected to the primary spreading is associated with $W_0$ to $W_3$ and $F_0$ to $F_2$ respectively and subjected to inverse fast Fourier transform (IFFT). The response signal spread by the ZAC sequence having a sequence length of 12 on the frequency axis is transformed into a ZAC sequence having a sequence length of 12 on the time axis by the IFFT. That is the signal subjected to the IFFT is further subjected to processing equivalent to secondary spreading using a Walsh sequence (sequence length of 4) and a DFT sequence (sequence length of 3).

Furthermore, the standardization of 3GPP LTE-advanced that realizes faster communication than 3GPP LTE has started. A 3GPP LTE-advanced system (which may also be hereinafter referred to as "LTE-A system") follows the 3GPP LTE system (which may also be hereinafter referred to as "LTE system"). In order to realize a downlink transmission rate of a maximum of 1 Gbps or above, 3GPP LTE-advanced is expected to introduce base stations and terminals capable of performing communication at a wideband frequency of 40 MHz or above.

In an LTE-A system, in order to simultaneously realize communication at an ultra-high transmission rate several times as fast as a transmission rate in the LTE system and backward compatibility with the LTE system, a band for the LTE-A system is divided into "unit bands" of 20 MHz or less, which is a support bandwidth for the LTE system. That is, the "unit band" herein is a band having a width of maximum 20 MHz and defined as a base unit of a communication band.

Furthermore, a "unit band" in a downlink (hereinafter, referred to as "downlink unit band") may be defined as a band divided by downlink frequency band information included in the BCH broadcasted from the base station, or a band defined by a dispersive width when the downlink control channel (PDCCH) is dispersed and arranged in the frequency domain. Furthermore, a "unit band" in an uplink (hereinafter, referred to as "uplink unit band") may be defined as a band divided by uplink frequency band information included in the BCH broadcasted from the base station, or as a base unit of communication band of 20 MHz or less, which includes physical uplink shared channel (PUSCH) region near the center thereof and PUCCHs for the LTE at both ends thereof.

Furthermore, in 3GPP LTE-Advanced, the "unit band" may also be expressed as "component carrier(s)" in English. Furthermore, the "unit band" may also be defined by a physical cell number and carrier frequency number, and may be called "cell."

The LTE-A system supports communication using a band that bundles several unit bands, so-called "carrier aggregation." In the LTE-A system, carrier aggregation in which the number of unit bands set for an arbitrary terminal supporting LTE-A system is (hereinafter referred to as "LTE-A terminal") is the same between the uplink and the downlink, so-called "symmetric carrier aggregation" and carrier aggregation in which the number of unit bands set for an arbitrary LTE-A terminal is different between the uplink and the downlink, so-called "asymmetric carrier aggregation" are being under study. The asymmetric carrier aggregation is useful when throughput requirements for an uplink are different from throughput requirements for a downlink. Furthermore, cases are also expected to be supported where the number of unit bands is asymmetric between the uplink and the downlink, and different unit bands have different frequency bandwidths.

FIG. 2 is a diagram illustrating asymmetric carrier aggregation applied to individual terminals and a control sequence thereof. FIG. 2 illustrates an example in which a bandwidth and the number of unit bands are symmetric between an uplink and a downlink in a base station.

In FIG. 2, a setting (configuration) is made for terminal 1 such that carrier aggregation is performed using two downlink unit bands and one uplink unit band on the left side, whereas a setting is made for terminal 2 such that although the two same downlink unit bands as those in terminal 1 are used, an uplink unit band on the right side is used for uplink communication.

Focusing attention on terminal 1, signals are transmitted/received between an LTE-A base station and an LTE-A terminal configuring an LTE-A system according to a sequence diagram illustrated in FIG. 2A. As illustrated in FIG. 2A, (1) terminal 1 is synchronized with the downlink unit band on the left side when communication with the base station starts, and reads information of the uplink unit band which forms a pair with the downlink unit band on the left side from a broadcast signal called "system information block type 2 (SIB2)." (2) Using this uplink unit band, terminal 1 starts communication with the base station by transmitting, for example, a connection request to the base station. (3) Upon deciding that a plurality of downlink unit bands need to be assigned to the terminal, the base station instructs the terminal to add a downlink unit band. In this case, however, the number of uplink unit bands does not increase, and terminal 1 which is an individual terminal starts asymmetric carrier aggregation.

Furthermore, in the LTE-A system, studies are being carried out on activation/de-activation for each downlink CC on a downlink unit band set for a terminal using signaling (e.g., reporting using MAC header) faster than signaling used for the setting (RRC signaling). FIG. 3 shows a conceptual diagram of this activation and de-activation.

FIG. 3 shows an example of a case where a downlink bandwidth of an LTE-A system managed by a base station is 100 MHz and each downlink unit band has 20 MHz. FIG. 3 illustrates a ease where the base station sets a downlink band of 60 MHz to terminal 1 (that is, sets (configures) three downlink unit bands) and activates two out of the three downlink unit bands. The base station activates one or a plurality of downlink unit bands out of the three unit bands set for terminal 1 as necessary, and can thereby make a flexible communication speed setting with the terminal. However, downlink CC#b is a specific downlink unit band always activated for terminal 1. The specific downlink unit band that the base station always activates for terminal 1 may be called "anchor component carrier" (anchor CC) or "primary component carrier (PCC)". On the other hand, downlink unit bands other than the anchor downlink unit band (PCC) may be called "secondary component carriers (SCCs)." Furthermore, the above-described specific downlink unit band may be defined as "downlink unit band used by the terminal to establish initial communication" in FIG. 2.

Similarly, FIG. 3 illustrates a case where the base station sets an 80 MHz downlink band (that is, sets (configures) four downlink unit bands) for terminal 2 and activates two out of the four downlink unit bands. The base station activates one or a plurality of downlink unit bands out of the four unit bands set for terminal 2, and can thereby make a flexible communication rate setting with terminal 2 as required.

Through this activation/de-activation, the terminal needs only to monitor necessary downlink unit bands when necessary, and it is thereby possible to obtains an effect of reducing power consumption of the terminal.

CITATION LIST

Non-Patent Literature

NPL 1
3GPP TS 36.211 V8.6.0, "Physical Channels and Modulation (Release 8)," March 2009
NPL 2
3GPP TS 36.212 V8.6.0, "Multiplexing and channel coding (Release 8)," March 2009
NPL 3
3GPP TS 36.213 V8.6.0, "Physical layer procedures (Release 8)," March 2009

SUMMARY OF INVENTION

Technical Problem

In the LTE-A system, the following two modes are being under study as transmission modes for a response signal. That is, a first mode is a so-called non-bundling mode in which response signals for a plurality of pieces of downlink data transmitted in a plurality of downlink unit bands are individually transmitted. In the so-called non-bundling mode, a plurality of response signals are assigned resources differing in at least one of frequency and code, and transmitted simultaneously. The non-bundling mode may be also called "multi-code transmission mode." Furthermore, a second mode is so-called ACK/NACK bundling (hereinafter simply referred to as "bundling") in which a plurality of response signals corresponding to a plurality of pieces of downlink data transmitted in a plurality of downlink unit bands are bundled into one piece and transmitted. In bundling, the terminal calculates AND (that is, logical AND) of a plurality of ACK/NACK signals to be transmitted and feeds back the calculation result as a "bundled ACK/NACK signal" (or also referred to as "bundled response signal")" to the base station.

When the above-described carrier aggregation is applied to the terminal, ARQ is controlled as follows. First, an ARQ control method in the bundling mode will be described with reference to FIG. 4. As shown in FIG. 4, in a case where a unit band group made up of downlink unit bands 1, 2, 3 and uplink unit band 1 is set for the terminal, downlink resource assignment information is transmitted from the base station to the terminal through respective PDCCHs of downlink unit bands 1, 2 and 3, and then downlink data is transmitted using resources corresponding to the downlink resource assignment information. In addition to the ACK/NACK signal for the downlink data transmitted in downlink unit band 1, ACK/NACK signals for the downlink data transmitted in downlink unit bands 2 and 3 are also transmitted through a PUCCH1 (PUCCH region 1) of uplink unit band 1 corresponding to downlink unit band 1.

When the terminal succeeds in receiving all of the three pieces of downlink data (CRC=OK), the terminal calculates AND of ACK(=1) for downlink unit band 1, ACK(=1) for downlink unit band 2 and ACK(=1) for downlink unit band 3, and as a result, transmits "1" (that is, ACK) as a bundled ACK/NACK signal to the base station. Furthermore, when the terminal succeeds in receiving downlink data in downlink unit band 1 and fails to receive downlink data in downlink unit bands 2 and 3, the terminal calculates AND of ACK(=1) for downlink unit band 1 and NACK(=0) for downlink unit bands 2 and 3 and transmits "0" (that is, NACK) as a bundled ACK/NACK signal to the base station. Similarly, when the terminal fails to receive all the three pieces of downlink data, the terminal calculates AND of NACK(=0), NACK(=0) and NACK(=0) and feeds back "0" (that is, NACK) as a bundled ACK/NACK signal to the base station.

Thus, according to the ARQ control method in the bundling mode, only when the terminal succeeds in receiving all of the plurality of pieces of downlink data transmitted to the terminal, the terminal transmits only one ACK as a bundled ACK/NACK signal to the base station. Furthermore, when the terminal fails to receive even one piece of downlink data out of the plurality of pieces of downlink data transmitted to the terminal, the terminal transmits only one NACK as a bundled ACK/NACK signal to the base station. Thus, the ARQ control method in the bundling mode can reduce overhead in an uplink control channel. The terminal transmits a bundled ACK/NACK signal using PUCCH resources, for example, of the smallest frequency or identification number (index) out of respective PUCCH resources corresponding to a plurality of CCEs occupied by the plurality of received downlink control signals.

By contrast, according to the ARQ control method in the non-bundling mode, as shown in FIG. 5, response signals corresponding to respective pieces of downlink data are transmitted individually. Like FIG. 4, FIG. 5 shows an example of a case where a unit band group made up of downlink unit bands 1, 2, 3 and uplink unit band 1 is set for a certain terminal.

However, the above-described two modes have their respective advantages and disadvantages. That is, in the bundling mode, the terminal calculates AND of response signals corresponding to data in a plurality of downlink unit bands, and transmits the ANDed signal. Thus, like the LTE system, it is possible to keep the single carrier characteristic of the transmission waveform on the terminal side first, and secondly since only one PUCCH resource is occupied, it is possible to reduce inter-code interference with other signals which constitute capacity constraints in PUCCHs. However, since success/failure of data reception in a plurality of downlink unit bands is not individually transmitted to the base station, if the terminal fails to receive even one piece of downlink data, the terminal returns NACK to the base station and the base station cannot help but retransmit all the data. That is, the bundling mode has an advantage of being able to reduce inter-code interference, whereas there is a problem that efficiency of retransmission control degrades.

On the other hand, in the non-bundling mode, although efficiency of retransmission control is high, overhead in an uplink control channel is greater than in the bundling mode. Furthermore, in the non-bundling mode, when the number of resources simultaneously used for transmission increases, the single carrier characteristic of the transmission waveform cannot be maintained on the terminal side, a PAPR increases significantly and power consumption efficiency with respect to the terminal drastically degrades.

For this reason, a mode called "partial bundling (may also be called "pre-bundling") shown in FIG. 6 is also being under study for the LTE-A system. In the partial bundling mode, some of a plurality of downlink unit bands set for the terminal are defined as a "partial bundling group" (hereinafter simply referred to as "bundling group"). Response signals corresponding to a plurality of pieces of downlink data transmitted in a plurality of downlink unit bands in a bundling group are bundled into one piece (subjected to bundling processing) and transmitted. Furthermore, when pieces of downlink data are received simultaneously in downlink unit bands included in different bundling groups, response signals corresponding to the respective pieces of downlink data are individually (subjected to non-bundling processing) transmitted.

The ARQ control method using partial bundling will be described with reference to FIG. 6. Like FIG. 4 and FIG. 5, FIG. 6 shows an example of a case where a unit band group made up of downlink unit bands 1, 2, 3 and uplink unit band 1 is set for a certain terminal. In the example shown in FIG. 6, the partial bundling group is formed of downlink unit bands 1 and 2 out of downlink unit bands 1, 2 and 3.

The partial bundling group is subjected to ARQ control by bundling. That is, the ACK/NACK signal corresponding to the downlink data transmitted in downlink unit band 1 and the ACK/NACK signal corresponding to the downlink data transmitted in downlink unit band 2 are transmitted through PUCCH1 (PUCCH region 1) of uplink unit band 1 corresponding to downlink unit band 1.

To be more specific, when the terminal succeeds in receiving all the downlink data of downlink unit bands 1 and 2 (CRC=OK), the terminal calculates AND of ACK(=1) corresponding to downlink unit band 1 and ACK(=1) corresponding to downlink unit band 2, and as a result, transmits "1" (that is, ACK) as a bundled ACK/NACK signal to the base station. Furthermore, when the terminal succeeds in receiving downlink data in downlink unit band 1 and fails to receive downlink data in downlink unit band 2, the terminal calculates AND of ACK(=1) corresponding to downlink unit band 1 and NACK(=0) corresponding to downlink unit band 2, and transmits "0" (that is, NACK) as a bundled ACK/NACK signal to the base station. Similarly, when the terminal fails to receive both pieces of the downlink data, the terminal calculates AND of NACK(=0) and NACK(=0) and feeds back "0" (that is, NACK) as a bundled ACK/NACK signal to the base station.

On the other hand, the downlink unit band for which no partial bundling group is formed is subjected to ARQ control by non-bundling. That is, an ACK/NACK signal corresponding to the downlink data transmitted in downlink unit band 3 is transmitted through PUCCH3 (PUCCH region 3) in uplink unit band 1 corresponding to downlink unit band 3.

Thus, when a unit band group made up of downlink unit bands 1, 2 and 3 and uplink unit band 1 is set for the terminal, if a partial bundling group is formed of downlink unit bands 1 and 2, a response signal is transmitted using PUCCU1 (PUCCH1 region) and PUCCH3 (PUCCH3 region) of uplink unit band 1.

By so doing, in partial bundling, although the PUCCH region to which a response signal is assigned increases compared to bundling, it is possible to suppress increase of the PUCCH region to which a response signal is assigned compared to non-bundling. Thus, partial bundling makes it possible to maintain efficiency of retransmission control to a certain degree while suppressing deterioration of a PAPR of the transmission waveform of the terminal to within an allowable range.

However, when such partial bundling is used, there are an enormous number of patterns as to which downlink unit bands are classified into the same bundling group, resulting in a problem that signaling overhead related to the bundling group increases.

The present invention has been implemented in view of the above problems and it is an object of the present invention to provide a terminal device and a response signal transmission method capable of reducing signaling overhead related to a bundling group in a communication system to which partial bundling is applied.

Solution to Problem

A terminal device according to the present invention adopts a configuration including: a receiving section that receives downlink data transmitted using at least one downlink unit band in a unit band group made up of a plurality of downlink unit bands; a generating section that generates a response signal obtained by bundling error detection results of the downlink unit bands included in the same bundling group based on a bundling rule according to which a bundling group is associated with each of the downlink unit bands constituting the unit band group; and a transmitting section that transmits the response signal arranged on an uplink control channel corresponding to one of the downlink unit bands associated with the same bundling group.

A method of transmitting a plurality of response signals according to the present invention includes: receiving downlink data transmitted using at least one downlink unit band in a unit band group made up of a plurality of downlink unit bands; generating a response signal obtained by bundling error detection results of the downlink unit bands included in the same bundling group based on a bundling rule according to which a bundling group is associated with each of the downlink unit bands constituting the unit band group; and transmitting the response signal arranged on an uplink control channel corresponding to one of the downlink unit bands associated with the same bundling group.

Advantageous Effects of Invention

According to the present invention, it is possible to reduce signaling overhead related to a bundling group in a communication system to which partial bundling is applied.

BRIEF DESCRIPTION OF DRAWINGS

FIG. 9 is a diagram illustrating bundling rule 1-1 in Embodiment 1;

FIG. 11 is a diagram illustrating bundling rule 1-3 in Embodiment 1; to FIG. 12 is a diagram illustrating a configuration example of a so-called heterogeneous network;

FIG. 16 is a diagram illustrating bundling rule 2-3 according to Embodiment 2.

DESCRIPTION OF EMBODIMENTS

Figure 1:
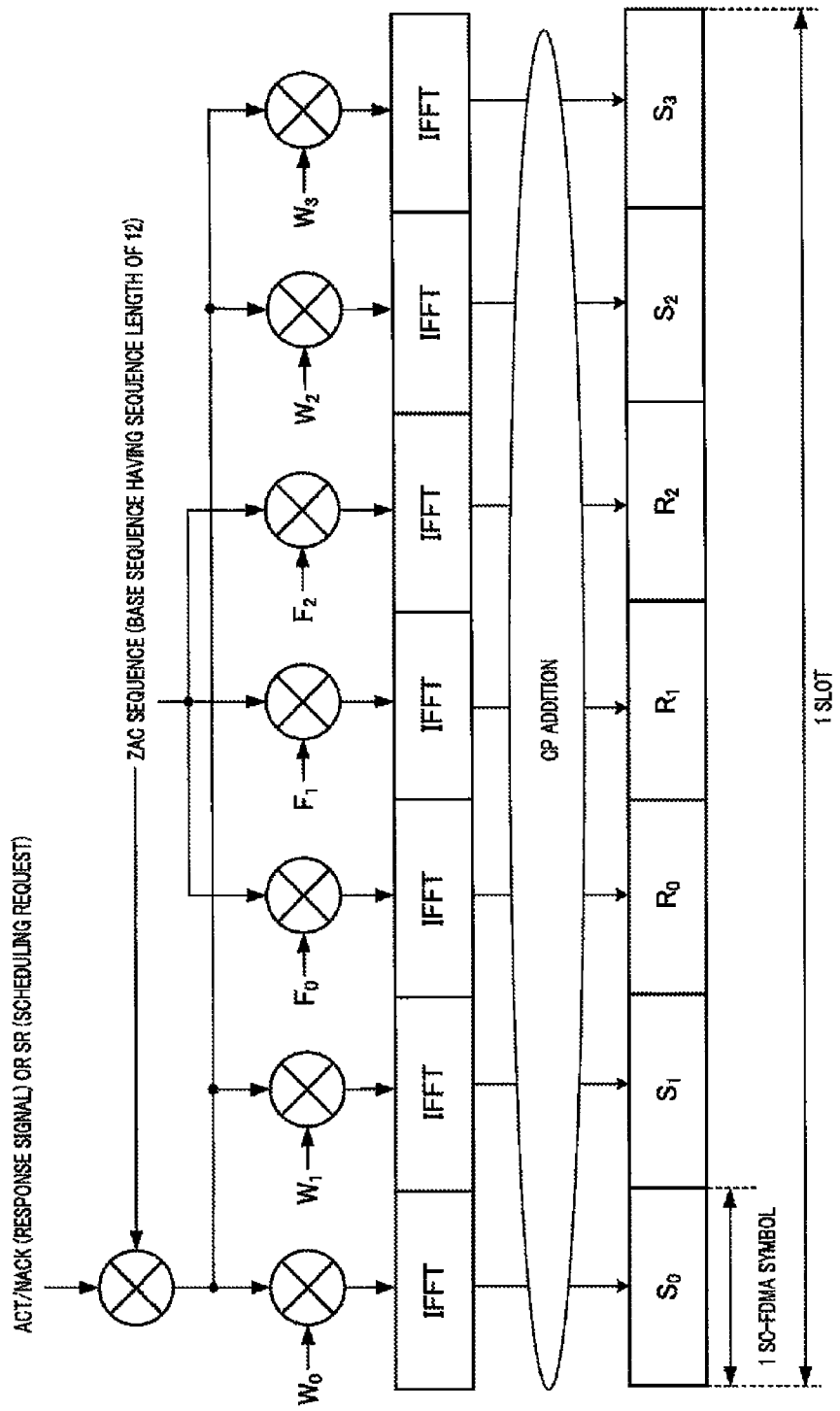
FIG. 1 is a diagram illustrating a method of spreading a response signal and a reference signal.
Figure 2B:
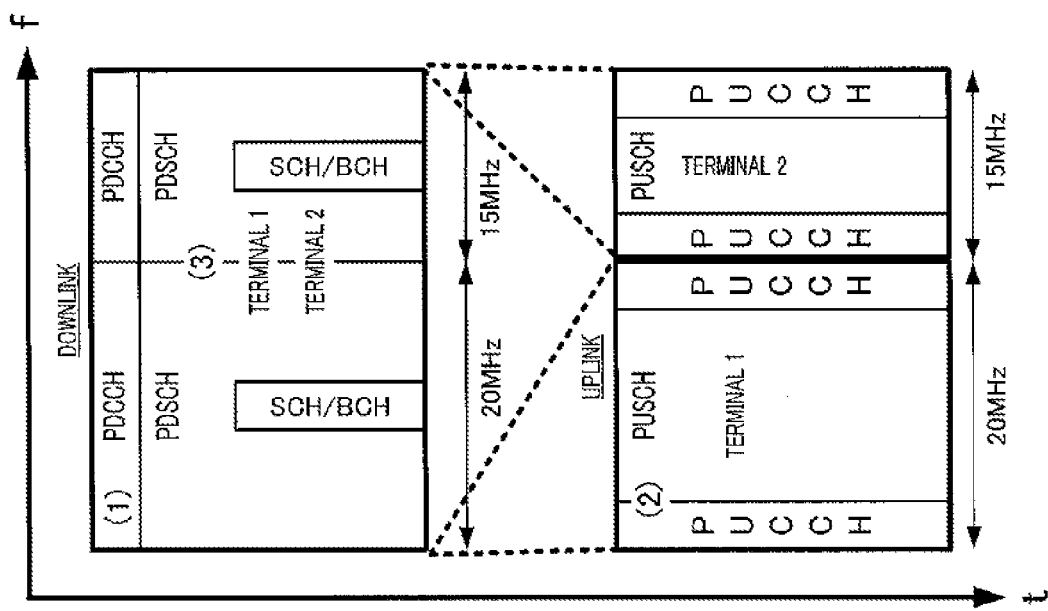
FIG. 2 is a diagram illustrating asymmetric carrier aggregation applied to individual terminals and a control sequence thereof.
Figure 2A:
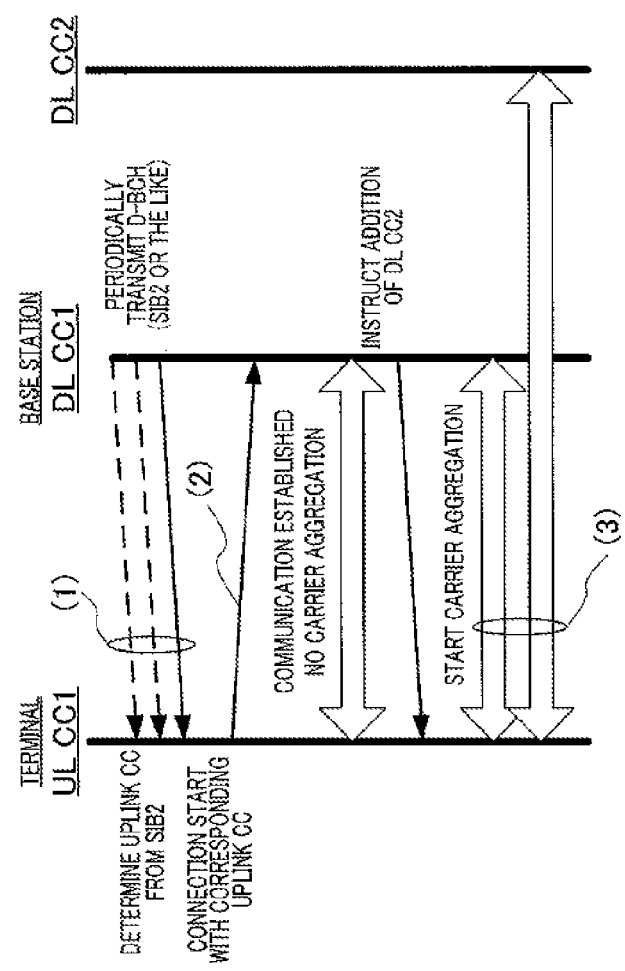
Figure 3:
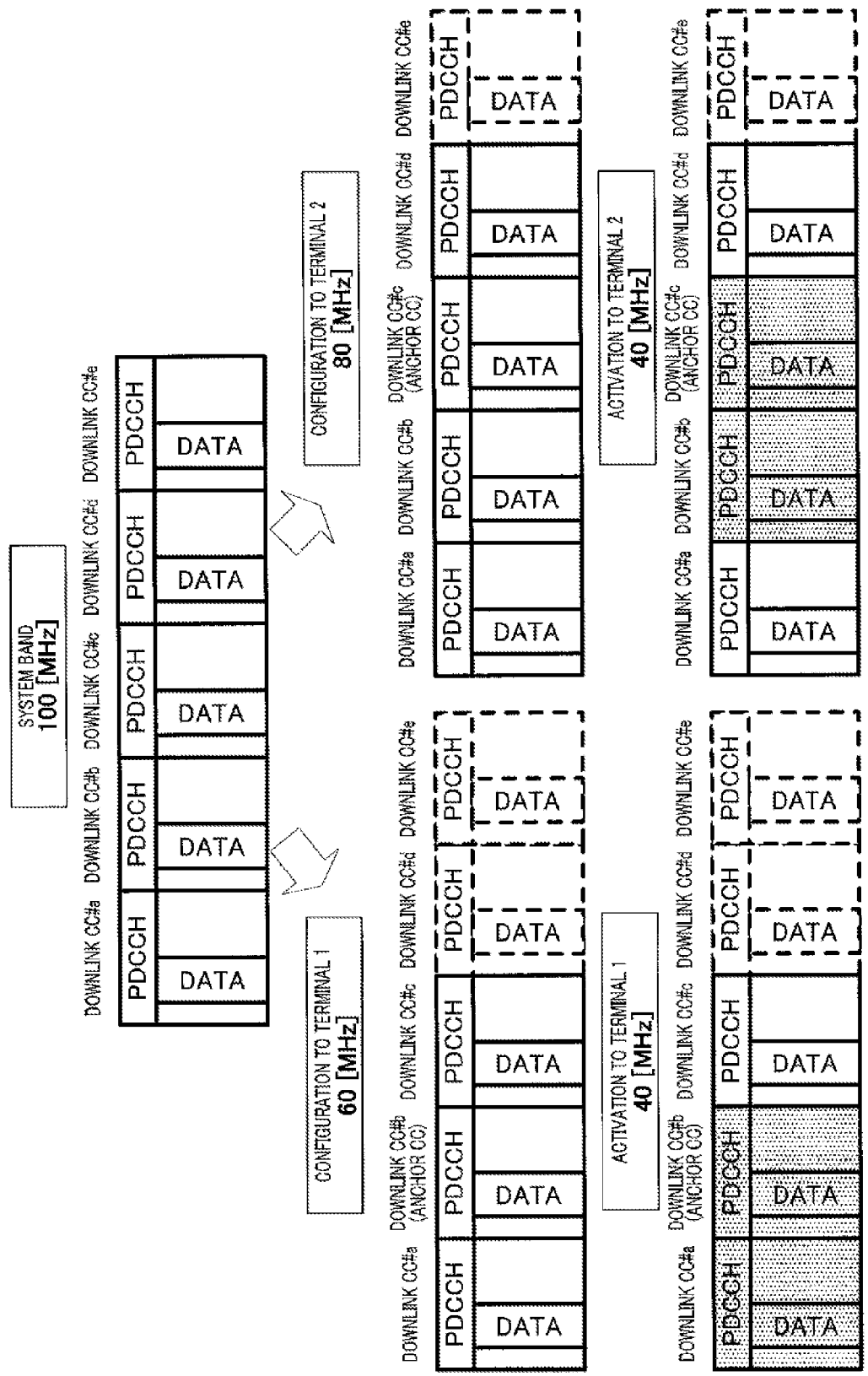
FIG. 3 is a diagram illustrating a conceptual diagram of activation and de-activation.
Figure 4:
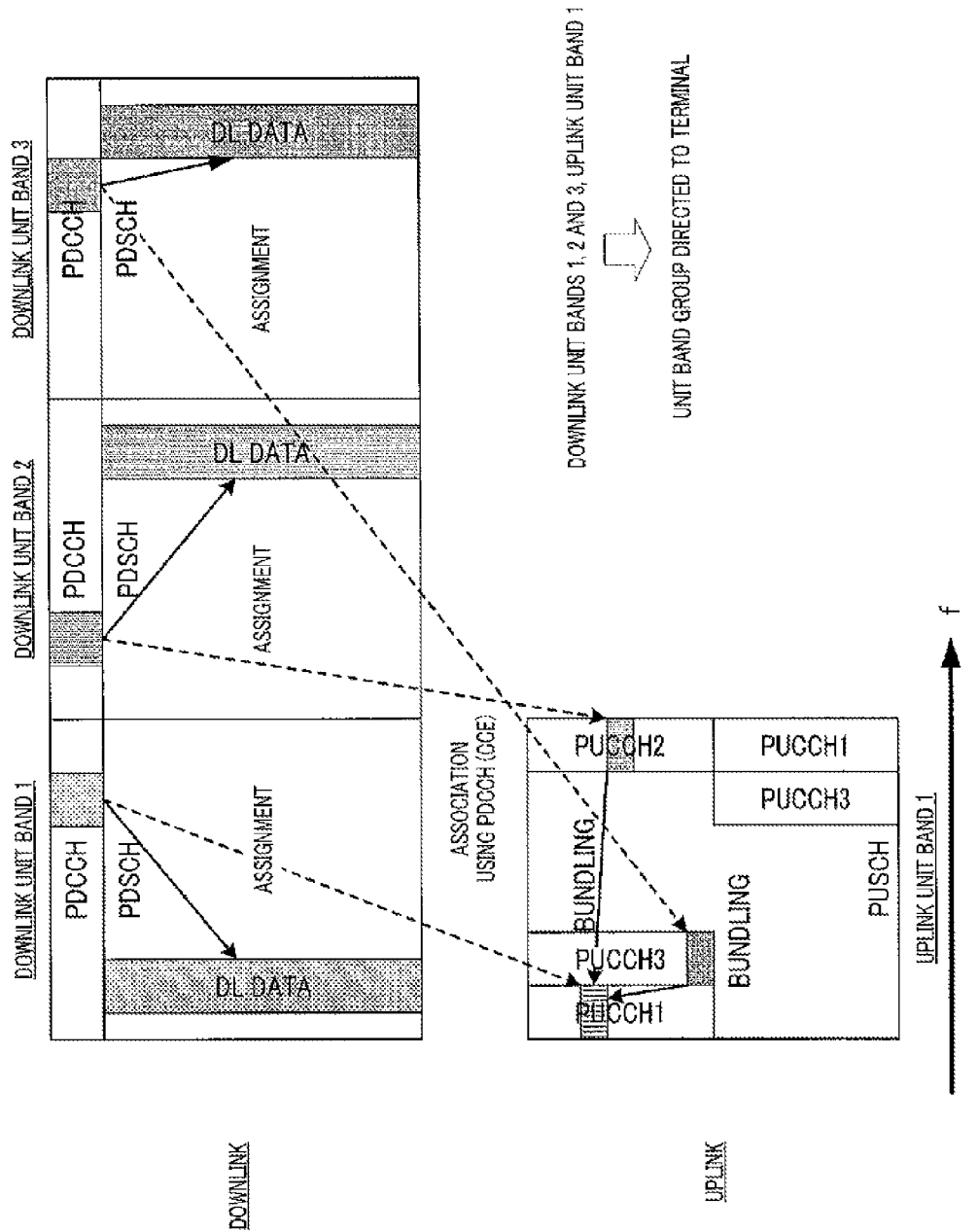
FIG. 4 is a diagram illustrating an ARQ control method in a bundling mode.
Figure 5:
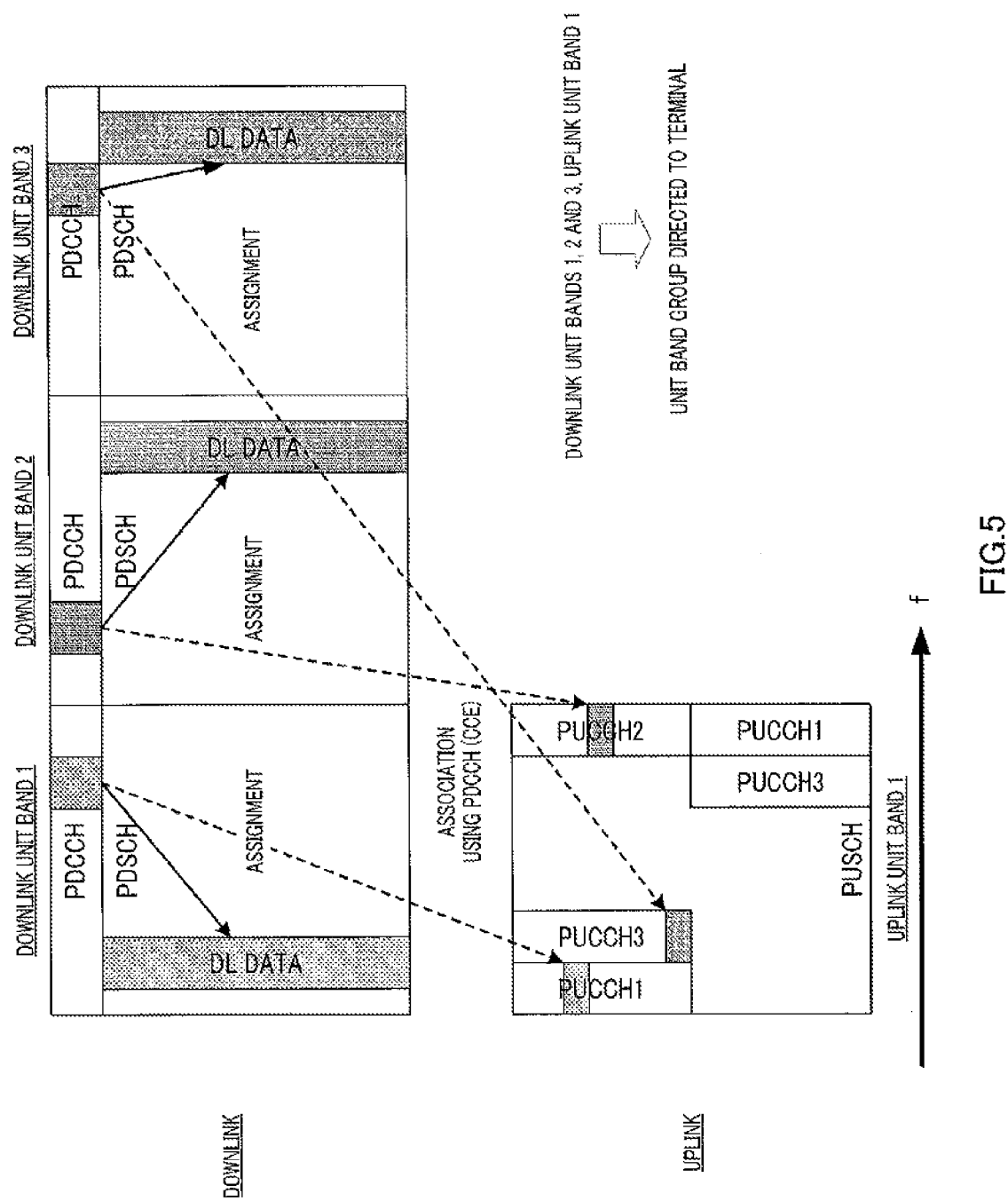
FIG. 5 is a diagram illustrating an ARQ control method in a non-bundling mode.
Figure 6:
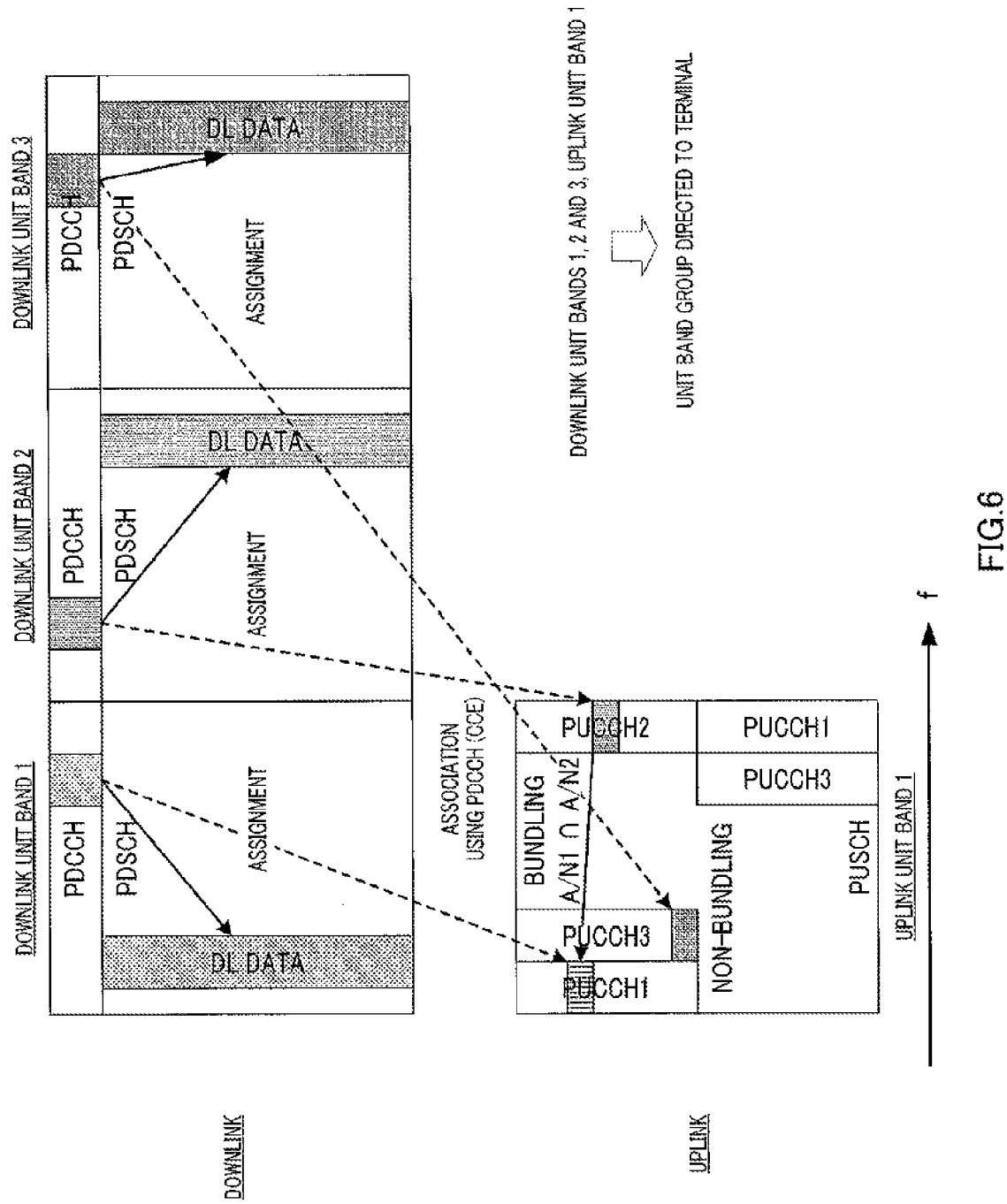
FIG. 6 is a diagram illustrating an ARQ control method in a partial bundling mode.

Hereinafter, embodiments of the present invention will be described in detail with reference to the accompanying drawings.

Embodiment 1

[Overview of Communication System]

In a communication system including base station 100 and terminal 200, which will be described later, communication using one uplink unit band and N (N is a natural number equal to or above 2) downlink unit bands associated with the uplink unit band, that is, communication using asymmetric carrier aggregation specific to terminal 200. This one uplink unit band and N downlink unit bands constitute a "unit band group" set (configured) for terminal 200.

Furthermore, base station 100, which will be described later, activates a plurality of downlink unit bands from within the "unit band group" set for terminal 200. Thus, base station 100 activates M (M is a natural number equal to or above 1, that satisfies M≤N) downlink unit bands from among downlink resources made up of N (N is a natural number equal to or above 2) consecutive downlink unit bands on the frequency axis. Hereinafter, in a unit band group, a downlink unit band activated by the base station is called "active downlink unit band" and furthermore, a downlink unit band group made up of active downlink unit bands is called "active downlink unit band group." In general, base station 100 preferentially activates a plurality of consecutive downlink unit bands on the frequency axis.

The information regarding the setting (configuration) and activation is reported to terminal 200 beforehand. Furthermore, a frequency position, frequency bandwidth or the like of each downlink unit band are also shared between base station 100 and terminal 200.

Furthermore, this communication system also includes a terminal, unlike terminal 200, that has no capability of performing communication based on carrier aggregation and performs communication using one downlink unit band and one uplink unit band associated therewith (that is, communication not based on carrier aggregation).

Thus, base station 100 is configured to support both communication based on asymmetric carrier aggregation and communication not based on carrier aggregation.

Communication not based on carrier aggregation may be performed between base station 100 and terminal 200 according to resource assignment with respect to terminal 200 by base station 100.

Furthermore, when performing communication not based on carrier aggregation, this communication system performs conventional ARQ control. On the other hand, when performing communication based on carrier aggregation, this communication system adopts ARQ control using partial bundling.

That is, this communication system is, for example, an LTE-A system, base station 100 is, for example, an LTE-A base station, and terminal 200 is, for example, an LTE-A terminal. The terminal having no function of performing communication based on carrier aggregation is, for example, an LTE terminal.

Furthermore, in this communication system, out of the N downlink unit bands set for terminal 200, all (N) downlink unit bands may be activated and downlink data may be transmitted in all (N) downlink unit bands. Downlink control information corresponding to the downlink data is not necessarily transmitted in the same downlink unit band, and the correspondence between the downlink control information and downlink data is explicitly reported to terminal 200 using a CIF (carrier indicator field) included in the downlink control information.

[Configuration of Base Station]

Figure 7:
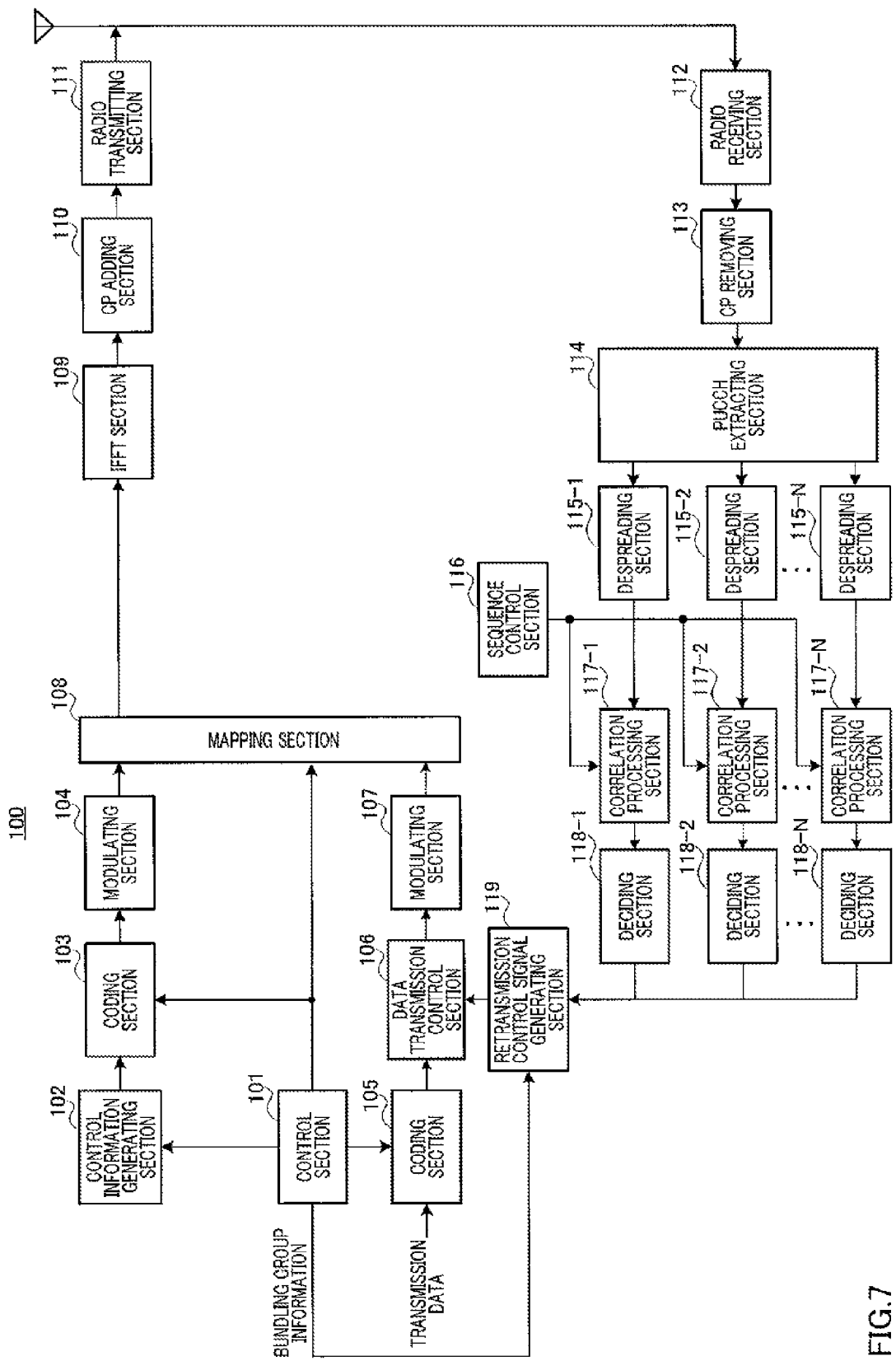
FIG. 7 is a block diagram illustrating a configuration of a base station according to Embodiment 1 of the present invention.

FIG. 7 is a block diagram illustrating a configuration of base station 100 according to the present embodiment. With reference to FIG. 7, base station 100 includes control section 101, control information generating section 102, coding section 103, modulating section 104, coding section 105, data transmission control section 106, modulating section 107, mapping section 108, IFFT section 109, CP adding section 110, radio transmitting section 111, radio receiving section 112, CP removing section 113, PUCCH extracting section 114, despreading section 115, sequence control section 116, correlation processing section 117, deciding section 118, and retransmission control signal generating section 119.

Control section 101 assigns downlink resources for transmitting control information (that is, downlink control information assignment resources) and downlink resources for transmitting downlink data included in the control information (that is, downlink data assignment resources) to resource assignment target terminal (hereinafter referred to as "destination terminal" or also simply referred to as "terminal") 200. This resource assignment is performed in an active downlink unit band activated out of downlink unit bands included in a unit band group set (configured) to resource assignment target terminal 200. The downlink control information assignment resource is selected from among resources corresponding to the downlink control channel (PDCCH) in each downlink unit band. Furthermore, the downlink data assignment resource is selected from among resources corresponding to the downlink data channel (PDSCH) in each downlink unit band. Furthermore, when a plurality of resource assignment target terminals 200 are present, control section 101 assigns different resources to respective resource assignment target terminals 200.

The downlink control information assignment resources are equivalent to the above-described L1/L2 CCHs. That is, each of the downlink control information assignment resources is configured with one or more CCEs. Furthermore, the CCEs are associated with component resources of the uplink control channel (PUCCH) in a one-to-one correspondence manner. That is, component resources of PUCCHS associated with CCEs constituting a plurality of downlink control information assignment resources transmitted to terminal 200 are all present in the uplink unit band set to terminal 200.

Control section 101 determines a coding rate used for transmitting control information to resource assignment target terminal 200. Since the amount of data of the control information differs according to this coding rate, control section 101 assigns downlink control information assignment resources having a number of CCEs to which the control information having this amount of data can be mapped.

Control section 101 outputs information related to the downlink data assignment resource to control information generating section 102. Furthermore, control section 101 outputs information related to a coding rate to coding section 103. Control section 101 decides a coding rate of transmission data (that is, downlink data) and outputs the decided coding rate to coding section 105. Furthermore, control section 101 outputs information related to the downlink data assignment resource and information related to the downlink control information assignment resource, to mapping section 108.

Furthermore, when mapping downlink data and downlink control information corresponding to the downlink data to the same downlink unit band, control section 101 sets a value for reporting that downlink data is transmitted to the same downlink unit band as that of the downlink control information to a CIF included in the downlink control information. On the other hand, when mapping downlink data and downlink control information corresponding to the downlink data to different downlink unit bands, control section 101 sets a value indicating a downlink unit band in which the downlink data indicated by the downlink control information is present to the CIF.

Furthermore, control section 101 outputs information related to the correspondence between each of the downlink unit bands constituting the unit band group set for each terminal 200 and a bundling group (hereinafter referred to as "bundling group information") to retransmission control signal generating section 119. However, the bundling group information is not updated at timing at which the downlink unit band is activated but changed when base station 100 sets a unit band group to terminal 200.

Control information generating section 102 generates control information including information related to the downlink data assignment resource, and outputs the generated control information to coding section 103. This control information is generated for each piece of downlink data. As described above, this control information is not always arranged in the same downlink unit band as that of the downlink data. Furthermore, when a plurality of resource assignment target terminals 200 are present, the control information includes a terminal ID of destination terminal 200 to distinguish between resource assignment target terminals 200. For example, the control information includes a CRC bit masked with the terminal ID of destination terminal 200. This control information may be called "downlink assignment control information (control information carrying downlink assignment)."

Furthermore, control information generating section 102 outputs information related to downlink control information assignment resources to mapping section 108 via coding section 103 and modulating section 104. Thus, mapping section 108 maps the control information to downlink control information assignment resources.

Coding section 103 encodes the control information according to the coding rate received from control section 101, and outputs the encoded control information to in section 104.

Modulating section 104 modulates the encoded control information and outputs the modulated signal to mapping section 108.

Coding section 105 receives transmission data for each destination terminal 200 (that is, downlink data) and coding rate information from control section 101 as input, encodes the transmission data at a coding rate indicated by the coding rate information and outputs the encoded transmission data to data transmission control section 106. However, when a plurality of downlink unit bands are assigned to destination terminal 200, coding section 105 encodes transmission data transmitted in each downlink unit band and outputs the encoded transmission data to data transmission control section 106.

At the time of first time transmission, data transmission control section 106 retains the encoded transmission data and also outputs the encoded transmission data to modulating section 107. The encoded transmission data is retained for each destination terminal 200. Furthermore, transmission data to one destination terminal 200 is retained for each downlink unit hand to transmit. Thus, not only retransmission control of all data to be transmitted to destination terminal 200 but also retransmission control of each downlink unit band can be performed.

Furthermore, when the retransmission control signal received from retransmission control signal generating section 119 indicates a retransmission instruction, data transmission control section 106 outputs the retained data corresponding to the retransmission control signal to modulating section 107. On the other hand, when the retransmission control signal received from retransmission control signal generating section 119 indicates that the data is not to be retransmitted, data transmission control section 106 deletes the retained data corresponding to the retransmission control signal. In this ease, data transmission control section 106 outputs the initial time transmission data to modulating section 107.

For the downlink data transmitted in a downlink unit band in the same bundling group, terminal 200 transmits a bundled ACK/NACK signal. The bundled ACK/NACK signal is a response signal corresponding to the downlink data transmitted in a plurality of downlink unit bands in the same bundling group. Thus, upon receiving a retransmission control signal indicating a retransmission instruction for the downlink data transmitted in the downlink unit band in the same bundling group, data transmission control section 106 outputs all of the plurality of pieces of retained data related to the bundled ACK/NACK to modulating section 107.

Terminal 200 transmits response signals corresponding to downlink data transmitted in downlink unit bands in different bundling groups separately using different PUCCH resources (resources differing in at least one of time, frequency and code). Thus, data transmission control section 106 can perform retransmission control independently among different bundling groups.

Modulating section 107 modulates the encoded transmission data received from data transmission control section 106, and outputs a modulated signal to mapping section 108.

Mapping section 108 maps the modulated signal of the control information received from modulating section 104 to a resource represented by the downlink control information assignment resource received from control section 101, and outputs a mapping result to IFFT section 109.

Furthermore, mapping section 108 maps the modulated signal of the transmission data received from modulating section 107 to a resource represented by the downlink data assignment resource received from control section 101, and outputs a mapping result to IFFT section 109.

The control information and transmission data mapped by mapping section 108 to a plurality of subcarriers in a plurality of downlink unit bands are transformed in IFFT section 109 from frequency domain signals into a time domain signal, transformed into an OFDM signal with a CP added thereto in CP adding section 110, then subjected to transmission processing such as D/A (digital to analog) conversion, amplification and up-conversion in radio transmitting section 111 and transmitted to terminal 200 via an antenna.

Radio receiving section 112 receives a response signal or reference signal transmitted from terminal 200 via an antenna and performs reception processing such as down-conversion, A/D (analog to digital) conversion on the response signal or reference signal.

CP removing section 113 removes a CP added to the response signal or the reference signal that has been subjected to the reception process.

PUCCH extracting section 114 extracts uplink control channel signals included in the received signal for each PUCCH region k (k=1 to N) and sorts the extracted uplink control channel (PUCCH) signals into despreading section 115-$k$ corresponding to each downlink unit band k. This uplink control channel signal may include the response signal and reference signal transmitted from terminal 200.

Despreading section 115-$k$, correlation processing section 117-$k$ and deciding section 118-$k$ perform processing on the uplink control channel signal extracted in PUCCH region k corresponding to downlink unit band k (k=1 to N). Base station 100 is provided with processing systems of despreading section 115-$k$, correlation processing section 117-$k$ and deciding section 118-$k$ corresponding to PUCCH region k associated with downlink unit band k (k=1 to N) available to base station 100.

To be more specific, despreading section 115-$k$ despreads the response signal with a blockwise spread code sequence used by terminal 200 for secondary spreading in PUCCH region k and outputs the despread response signal to correlation processing section 117-$k$. Furthermore, despreading section 115-$k$ despreads the reference signal with an orthogonal sequence used by terminal 200 to spread the reference signal in PUCCH region k and outputs the despread reference signal to correlation processing section 117-$k$.

Sequence control section 116 generates a ZAC sequence used to spread the response signal transmitted from terminal 200. Furthermore, sequence control section 116 specifies a correlation window including a signal component from terminal 200 in each PUCCH region k based on code resources (e.g., amount of cyclic shift) used in terminal 200. Sequence control section 116 then outputs information indicating the specified correlation window and the ZAC sequence generated to correlation processing section 117-$k$.

Correlation processing section 117-$k$ obtains a correlation value between the despread response signal and despread reference signal, and the ZAC sequence used for primary spreading in terminal 200 using the information indicating the correlation window and the ZAC sequence inputted from sequence control section 116 and outputs the correlation value to deciding section 118-$k$.

Deciding section 118-$k$ decides whether the response signal transmitted from terminal 200 is ACK, NACK or DTX based on the correlation value inputted from correlation processing section 117-$k$. That is, when the magnitude of the correlation value inputted from correlation processing section 117-$k$ is equal to or below a certain threshold, deciding section 118-$k$ decides that terminal 200 has transmitted neither ACK nor NACK (DTX) using the resources, and when the magnitude of the correlation value is equal to or above the threshold, deciding section 118-$k$ further decides, through coherent detection, which of ACK or NACK is indicated by the response signal. Deciding section 118-$k$ then outputs ACK, NACK or DTX information for each terminal to retransmission control signal generating section 119.

Retransmission control signal generating section 119 decides whether or not to retransmit data transmitted in each downlink unit band based on a plurality of response signals included in the received signal and generates a retransmission control signal based on the decision result.

To be more specific, when a bundled ACK/NACK signal indicating NACK (by partial bundling) or ACK/NACK signal (by non-bundling), or DTX is received, retransmission control signal generating section 119 generates a retransmission control signal indicating a retransmission instruction and outputs the retransmission control signal to data transmission control section 106. Furthermore, when a bundled ACK/NACK signal indicating ACK (by partial bundling) or ACK/NACK signal (by non-bundling) is received, retransmission control signal generating section 119 generates a retransmission control signal indicating that the data is not retransmitted and outputs the retransmission control signal to data transmission control section 106.

[Configuration of Terminal]

Figure 8:
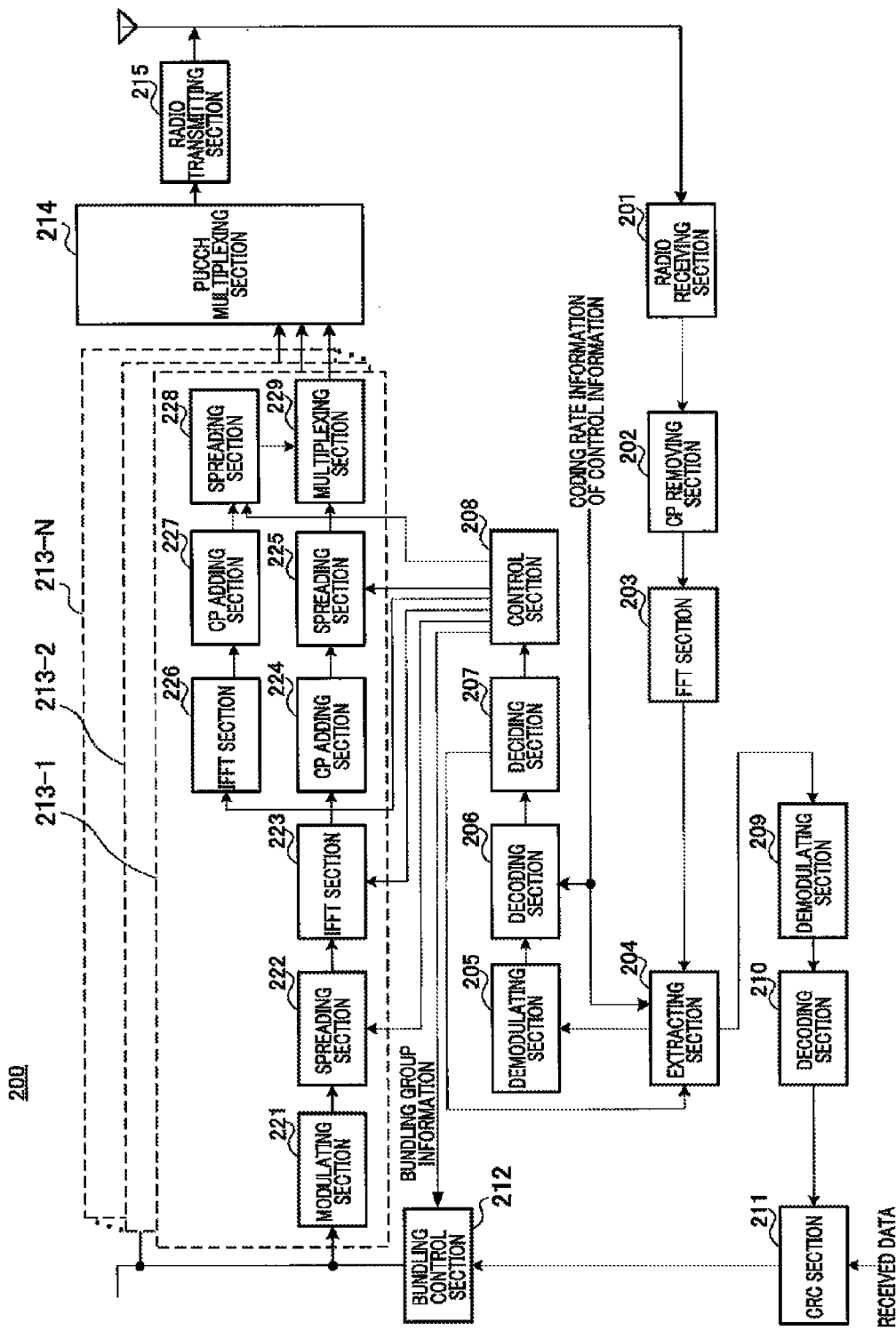
FIG. 8 is a block diagram illustrating a configuration of a terminal according to Embodiment 1.

FIG. 8 is a block diagram illustrating a configuration of terminal 200 according to the present embodiment. In FIG. 8, terminal 200 includes radio receiving section 201, CP removing section 202, FFT section 203, extracting section 204, demodulating section 205, decoding section 206, deciding section 207, control section 208, demodulating section 209, decoding section 210, CRC section 211, bundling control section 212, uplink control channel signal generating sections 213-1 to 213-N, PUCCH multiplexing section 214 and radio transmitting section 215.

Radio receiving section 201 receives an OFDM signal transmitted from base station 100 through an antenna, and performs a reception process, such as a down-conversion process, and A/D conversion process, on the received OFDM signal.

CP removing section 202 removes a CP added to the OFDM signal after the reception processing.

FFT section 203 transforms the received OFDM signal into a frequency domain signal by FFT and outputs the received signal to extracting section 204.

Extracting section 204 extracts a downlink control channel signal (PDCCH signal) from the received signal received from FFT section 203 according to coding rate information of control information inputted. That is, since the number of CCEs configuring the downlink control information assignment resource changes depending on the coding rate, extracting section 204 extracts the downlink control channel signal using the number of CCEs which corresponds to the coding rate as an extraction unit. The downlink control channel signal is extracted for each downlink unit band. Extracting section 204 outputs the extracted downlink control channel signal to demodulating section 205.

Furthermore, extracting section 204 extracts downlink data from the received signal based on the information related to the downlink data assignment resource, which is addressed to its own terminal, received from deciding section 207 which will be described later, and outputs the extracted downlink data to demodulating section 209.

Demodulating section 205 demodulates the downlink control channel signal received from extracting section 204, and outputs the obtained demodulation result to decoding section 206.

Decoding section 206 decodes the demodulation result received from demodulating section 205 according to the coding rate information of the inputted control information, and outputs the obtained decoding result to deciding section 207.

Deciding section 207 makes a blind decision as to whether or not control information included in the decoding result received from decoding section 206 is control information addressed to its own terminal. This decision is made using the decoding result corresponding to the extraction unit as a unit. For example, deciding section 207 demasks a CRC bit using the terminal ID of its own terminal, and decides control information with CRC=OK (no error) as the control information addressed to its own terminal. Then, deciding section 207 outputs information related to the downlink data assignment resource for its own terminal, which is included in the control information addressed to its own terminal, to extracting section 204.

Furthermore, deciding section 207 specifies a downlink unit band to which control information addressed to its own terminal is mapped and a CCE to which the control information addressed to its own terminal is mapped in the downlink unit band, and outputs the specified downlink unit band and identification information of the CCE to control section 208.

Control section 208 specifies a PUCCH region that forms a pair with the downlink unit band indicated by the identification information of the downlink unit band received from deciding section 207 and PUCCH resources (frequency and code) corresponding to the CCE indicated by the CCE identification information. Control section 208 outputs the ZAC sequence and the amount of cyclic shift corresponding to the PUCCH resources specified in PUCCH region k (k=1 to N) that forms a pair with each downlink unit band to spreading section 222 of uplink control channel signal generating section 213-$k$ corresponding to each PUCCH region k and outputs frequency resource information to IFFT section 223. Furthermore, control section 208 outputs the ZAC sequence and frequency resource information as a reference signal to IFFT section 226, outputs the blockwise spread code sequence to be used for secondary spreading of the response signal to spreading section 225 and outputs the orthogonal sequence to be used for secondary spreading of the reference signal to spreading section 228.

Furthermore, control section 208 sets information related to the correspondence between each downlink unit band configuring the unit band group and the bundling group (bundling group information) and outputs the set bundling group information to bundling control section 212. Control section 208 updates bundling group information every time a unit band group is set for its own terminal. Details of the bundling group information will be described later.

Demodulating section 209 demodulates the downlink data received from extracting section 204, and outputs the demodulated downlink data to decoding section 210.

Decoding section 210 decodes the downlink data received from demodulating section 209, and outputs the decoded downlink data to CRC section 211.

CRC section 211 generates the decoded downlink data received from decoding section 210, performs error detection for each downlink unit band using a CRC, outputs ACK when CRC=OK (no error) or NACK when CRC=NG (error) to bundling control section 212. Furthermore, when CRC=OK (no error), CRC section 211 outputs the decoded downlink data as received data.

Bundling control section 212 generates a response signal to be transmitted by its own terminal to base station 100 based on the reception situation of the downlink data transmitted in each downlink unit band included in the unit band group set for its own terminal and the bundling group information received from control section 208. To be more specific, bundling control section 212 generates a bundled ACK/NACK signal for each bundling group as a response signal to the downlink data transmitted in a plurality of downlink unit bands included in each bundling group through bundling processing. Bundling control section 212 outputs the bundled ACK/NACK signal generated for each bundling group to uplink control channel signal generating section 213-$g$ ($g$ is an integer which is one of 1 to N) corresponding to one of downlink unit bands in the same bundling group out of uplink control channel signal generating sections 213-1 to 213-N.

Uplink control channel signal generating section 213-$k$ ($k$=1 to N) generates an uplink control channel signal transmitted with each PUCCH region k based on a response signal received from bundling control section 212. Terminal 200 is provided with uplink control channel signal generating section 213-$k$ corresponding to each PUCCH region k available to base station 100 and terminal 200.

However, since a bundled ACK/NACK signal is reported using one PUCCH region in the same bundling group, two or more PUCCH regions corresponding to downlink unit bands included in the same bundling group are never used simultaneously. Therefore, if the number of bundling groups is assumed to be M, maximum M bundled ACK/NACK signals are outputted from bundling control section 212 to M of N uplink control channel signal generating sections 213-1 to 213-N.

Uplink control channel signal generating section 213-$k$ ($k$=1 to N) includes modulating section 221, spreading section 222, IFFT section 223, CP adding section 224, spreading section 225, IFFT section 226, CP adding section 227, spreading section 228 and multiplexing section 229.

Modulating section 221 modulates a bundled response signal inputted from bundling control section 212 (that is, bundled ACK/NACK signal) and outputs the modulated response signal to spreading section 222.

Spreading section 222 primary-spreads the response signal based on the ZAC sequence and the amount of cyclic shift set by control section 208 and outputs the primary-spread response signal to IFFT section 223. That is, spreading section 222 primary-spreads the response signal according to an instruction from control section 208.

IFFT section 223 arranges the primary-spread response signal on the frequency axis based on the frequency resource information inputted from control section 208 and performs IFFT on the response signal. IFFT section 223 then outputs the response signal subjected to the IFFT to CP adding section 224.

CP adding section 224 adds the same signal as the tail portion of the response signal subjected to the IFFT to the head of the response signal as a CP.

Spreading section 225 secondary-spreads the response signal after the CP addition using the blockwise spread code sequence set by control section 208 and outputs the secondary-spread response signal to multiplexing section 229. That is, spreading section 225 secondary-spreads the primary-spread response signal using the blockwise spread code sequence corresponding to the resources selected in control section 208.

IFFT section 226 arranges the reference signal on the frequency axis based on the frequency resource information inputted from control section 208 and performs IFFT. IFFT section 226 then outputs the reference signal subjected to the IFFT to CP adding section 227.

CP adding section 227 adds the same signal as the tail portion of the reference signal subjected to the IFFT to the head of the reference signal as a CP.

Spreading section 228 spreads the reference signal after the CP addition with an orthogonal sequence instructed from control section 208 and outputs the spread reference signal to multiplexing section 229.

Multiplexing section 229 time-multiplexes the secondary-spread response signal and the spread reference signal into one slot and outputs the multiplexed signal to PUCCH multiplexing section 214.

PUCCH multiplexing section 214 superimposes a plurality of uplink control channel signals inputted from uplink control channel signal generating sections 213-1 to 213-N and outputs the multiplexed signal obtained to radio transmitting section 215. However, as described above, since a maximum of M uplink control channel signals are generated, PUCCH multiplexing section 214 also superimposes a maximum of M uplink control channel signals.

Radio transmitting section 215 performs transmission processing such as D/A conversion, amplification and up-conversion on the multiplexed signal received from PUCCH multiplexing section 214 and transmits the processed multiplexed signal to base station 100 from an antenna.

[Operation of Base Station 100 and Terminal 200]

Operation of base station 100 and terminal 200 having the above-described configurations will be described.

Radio receiving section 201 receives downlink data transmitted using an active downlink unit band to which downlink data is actually assigned in a unit band group made up of a plurality of downlink unit bands and at least one uplink unit band.

Control section 208 outputs bundling group information based on a bundling rule to bundling control section 212. Here, the bundling rule is a rule according to which a bundling group is associated with each of downlink unit bands configuring a unit band group. For example, control section 208 maintains a table in which each of downlink unit bands configuring the unit band group is associated with a bundling group in a one-to-one correspondence (hereinafter referred to as "bundling group table") based on the bundling rule as bundling group information. That is, in the bundling group table, each of downlink unit bands configuring the unit band group is associated with the bundling group in a one-to-one correspondence. Control section 208 updates the bundling group table based on the bundling rule every time a unit band group is set for its own terminal and outputs the updated bundling group table as bundling group information to bundling control section 212.

Bundling control section 212 as a response signal generating section bundles error detection results of downlink unit bands included in the same bundling group out of a plurality of active downlink unit bands based on the bundling group table indicated by the bundling group information and generates a bundled response signal (bundled ACK/NACK signal).

Bundling control section 212 outputs the generated bundled ACK/NACK signal to uplink control channel signal generating section 213-g (g is an integer which is one of 1 to N) corresponding to one of downlink unit bands in the same bundling group out of uplink control channel signal generating sections 213-1 to 213-N.

A transmitting section constructed of uplink control channel signal generating section 213-k (k=1 to N), PUCCH multiplexing section 214 and radio transmitting section 215 transmits a bundled ACK/NACK signal arranged on an uplink control channel corresponding to one of active downlink unit bands associated with the same bundling group.

[Bundling Rule]

Hereinafter, the bundling rule will be described according to which a bundling group is associated with each of downlink unit bands configuring the unit band group.

A case will be described below as an example where five downlink unit bands #a to #e (downlink CC#a to #e) are set for terminal 200 as downlink unit bands configuring the unit band group.

[Bundling Rule 1-1] (See FIG. 9)

FIG. 9 is a diagram illustrating bundling rule 1-1. According to bundling rule 1-1, of five downlink unit bands configuring the unit band group, downlink unit bands included in at least one of pairs of downlink unit bands neighboring each other on the frequency axis are associated with different bundling groups.

In the example shown in FIG. 9, downlink CC#a and #b neighboring each other on the frequency axis are associated with bundling groups 1 and 2. Furthermore, downlink CC#b and #c neighboring each other on the frequency axis are associated with bundling groups 2 and 1. Furthermore, downlink CC#c and #d neighboring each other on the frequency axis are associated with different bundling groups 1 and 2, Furthermore, downlink CC#d and #e neighboring each other on the frequency axis are associated with different bundling groups 2 and 1.

Thus, bundling group 1 is formed of downlink CC#a, #c and #e which are not neighboring each other on the frequency axis. Similarly, bundling group 2 is formed of downlink CC#b and #d which are not neighboring each other on the frequency axis.

When base station 100 activates a plurality of downlink unit bands for terminal 200, base station 100 may be more likely to preferentially activate downlink unit bands neighboring each other on the frequency axis (downlink unit bands located at a short distance from each other on the frequency axis) in consideration of reception-related power consumption efficiency of terminal 200. That is, a pair of downlink unit bands neighboring each other on the frequency axis are more likely to be simultaneously used for transmission of downlink data than a pair of downlink unit bands not neighboring each other on the frequency axis. In other words, a pair of downlink unit bands neighboring each other on the frequency axis are more likely to be simultaneously set to active downlink unit bands.

The present inventor et al. focused attention on this point. That is, regarding activation for each downlink unit band, the present inventor et al, focused attention on the fact that the operation of simultaneously activating downlink unit bands neighboring each other on the frequency axis is preferable for reception-related power consumption efficiency of terminal 200 (focus point 1). Furthermore, the present inventor et al. has further focused attention on the fact that when partial bundling is applied to terminal 200, retransmission efficiency of downlink data will not degrade if a plurality of downlink unit bands in a bundling group are not simultaneously used for transmission of downlink data as much as possible (focus point 2). The present inventor et al. considered it possible to maintain retransmission efficiency of downlink data while reducing signaling necessary for reporting a bundling group by associating the method of forming the bundling group with physical frequency positions.

Thus, as bundling rule 1-1, of the five downlink unit bands configuring a unit band group, downlink unit bands included in at least one of pairs of downlink unit band neighboring each other on the frequency axis are associated with different bundling groups. That is, according to bundling rule 1-1, a bundling group is formed such that downlink unit bands neighboring each other on the frequency axis which are more likely to be simultaneously set to active downlink unit bands belong to different bundling groups.

Thus, when a bundling group table based on bundling rule 1-1 (see FIG. 9B) is used, downlink unit bands neighboring each other on the frequency axis are sorted into different bundling groups. Therefore, when base station 100 activates downlink unit bands neighboring to the frequency axis as active downlink unit bands for terminal 200, it is possible to reduce the probability that bundling processing may actually be performed on a response signal from terminal 200 to base station 100.

Thus, by forming a bundling group such that downlink unit bands neighboring each other on the frequency axis belong to different bundling groups, it is possible to reduce the possibility that the plurality of downlink unit bands in the bundling group may be simultaneously used for transmission of downlink data. Terminal 200 then updates the bundling group table based on bundling rule 1-1 every time a unit band group is set, and can thereby reduce the probability that bundling processing may be actually performed on a response signal from terminal 200 to base station 100 without separately performing signaling related to the bundling group and maintain the efficiency of retransmission control over downlink data while reducing signaling necessary for reporting the bundling group.

The downlink unit bands neighboring (or consecutive) on the frequency axis need not always to be completely neighboring (or consecutive) (the same applies to other bundling rules which will be described later). That is, the above-described effect can be obtained by forming a group such that a plurality of downlink unit bands located at the shortest distance on the frequency axis (that is, having the smallest frequency difference) are caused to belong to different bundling groups.

Figures 10A, 10B:
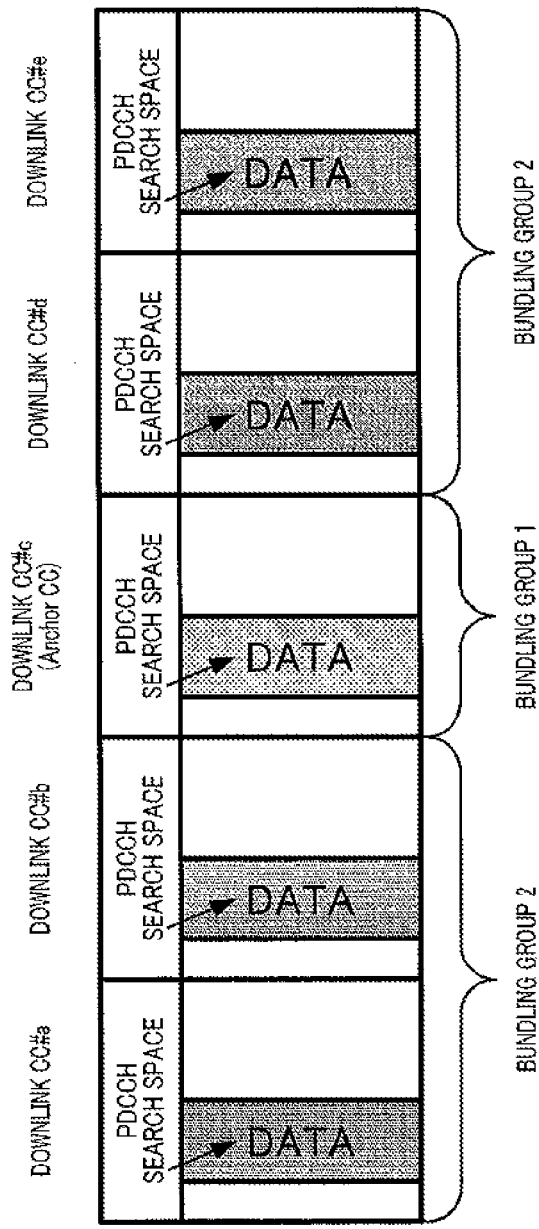
FIG. 10 is a diagram illustrating bundling rule 1-2 in Embodiment 1.

[Bundling Rule 1-2] (See FIG. 10)

FIG. 10 is a diagram illustrating bundling rule According to bundling rule 1-2, of downlink unit bands set for the terminal, an anchor downlink unit band (PCC) which is always activated and downlink unit bands neighboring the anchor CC on the frequency axis are associated with different bundling groups. That is, a bundling group is formed such that downlink unit bands neighboring the anchor CC on the frequency axis (or located at the shortest distance from the anchor CC on the frequency axis) are caused to belong to a bundling group different from that of the anchor CC.

The example shown in FIG. 10 is an example of a case where downlink CC#c is an anchor CC which is always activated and when downlink CC#c is associated with bundling group 1, downlink CC#b and #d neighboring downlink CC#c on the frequency axis are associated with bundling group 2.

As described above, when base station 100 activates a plurality of downlink unit bands for terminal 200, base station 100 may be more likely to preferentially activate downlink unit bands neighboring each other on the frequency axis (located at a short distance from each other on the frequency axis) in consideration of the reception-related power consumption efficiency of terminal 200. That is, base station 100 may be more likely to preferentially activate downlink unit bands neighboring the anchor CC on the frequency axis (located at a short distance from the anchor CC on the frequency axis) as active downlink unit bands.

The present inventor et al, focused attention on this point in addition to focus points 1 and 2 described in bundling rule 1-1. That is, the present inventor et al. focused attention on the fact that one of a plurality of downlink unit bands included in a unit band group set for terminal 200 is always activated as an anchor CC (focus point 3). The present inventor et al. thought that it would be possible to maintain the downlink data retransmission efficiency while reducing signaling necessary for reporting a bundling group by not only associating the method of forming a bundling group with absolute frequency positions but also associating the method with the correspondence between downlink unit bands and the anchor CC.

Thus, as bundling rule 1-2, of downlink unit bands set (configured) for the terminal, an anchor CC which is always activated and downlink unit bands neighboring the anchor CC on the frequency axis are associated with different bundling groups (bundling rule 1-2). That is, according to bundling rule 1-2, a bundling group is formed such that downlink unit bands neighboring the anchor CC on the frequency axis which are likely to be simultaneously set to active downlink unit bands belong to a bundling group different from that of the anchor CC.

Thus, when a bundling group table according to bundling rule 1-2 (see FIG. 10B) is used, downlink unit bands neighboring the anchor CC which is always activated on the frequency axis are sorted into a different bundling group. Therefore, when base station 100 preferentially activates downlink unit bands neighboring each other on the frequency axis as active downlink unit bands for terminal 200, it is possible to prevent bundling processing from actually being performed on a response signal from terminal 200 to base station 100.

Thus, by forming a bundling group such that downlink unit bands neighboring an anchor CC which is always activated on the frequency axis are caused to belong to a bundling group different from that of the anchor CC, it is possible to reduce the possibility that a plurality of downlink unit bands in the bundling group may be simultaneously used (simultaneously activated) for transmitting downlink data, Every time a unit band group is set, terminal 200 updates a bundling group table based on bundling rule 1-2, and can thereby reduce the probability that bundling processing may be actually performed on a response signal from terminal 200 to base station 100 without separately performing signaling related to the bundling group and maintain the efficiency of retransmission control over downlink data while reducing signaling necessary for reporting the bundling group.

[Bundling Rule 1-3] (See FIG. 11)

FIG. 11 is a diagram illustrating bundling rule 1-3. According to bundling rule 1-3, of downlink unit bands configuring a unit band group for a certain terminal, downlink unit bands in which downlink assignment control information for the terminal may be arranged are associated with different bundling groups as much as possible. Here, the "downlink unit bands in which downlink assignment control information may be arranged" are downlink unit bands for which terminal 200 makes a blind decision on downlink assignment control information and in an LTE-A system, such downlink unit bands may be expressed as "downlink unit bands for which a search space of downlink control information for the terminal is set."

That is, according to bundling rule 1-3, a bundling group is formed such that downlink unit bands in which a search space of PDCCH for terminal 200 is set are preferentially caused to belong to different bundling groups. For example, in examples shown in FIG. 11A and FIG. 11B, three downlink unit bands in which PDCCH search spaces are set are associated with bundling groups 1, 2 and 3 respectively. On the other hand, in examples shown in FIG. 11C and FIG. 11D, two downlink unit bands in which PDCCH search spaces are set are associated with bundling groups 1 and 2 respectively.

Figure 12:
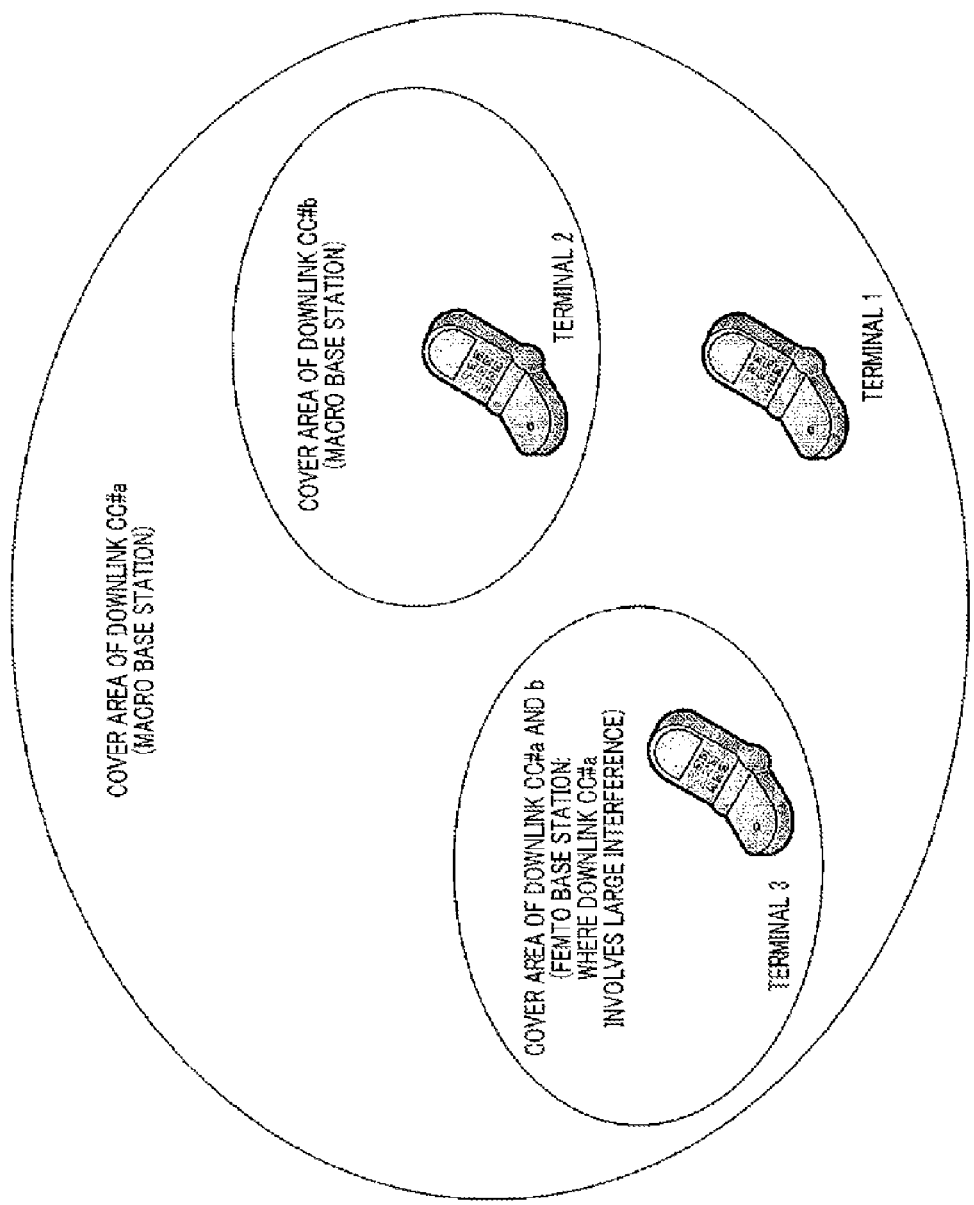
Figure 13:
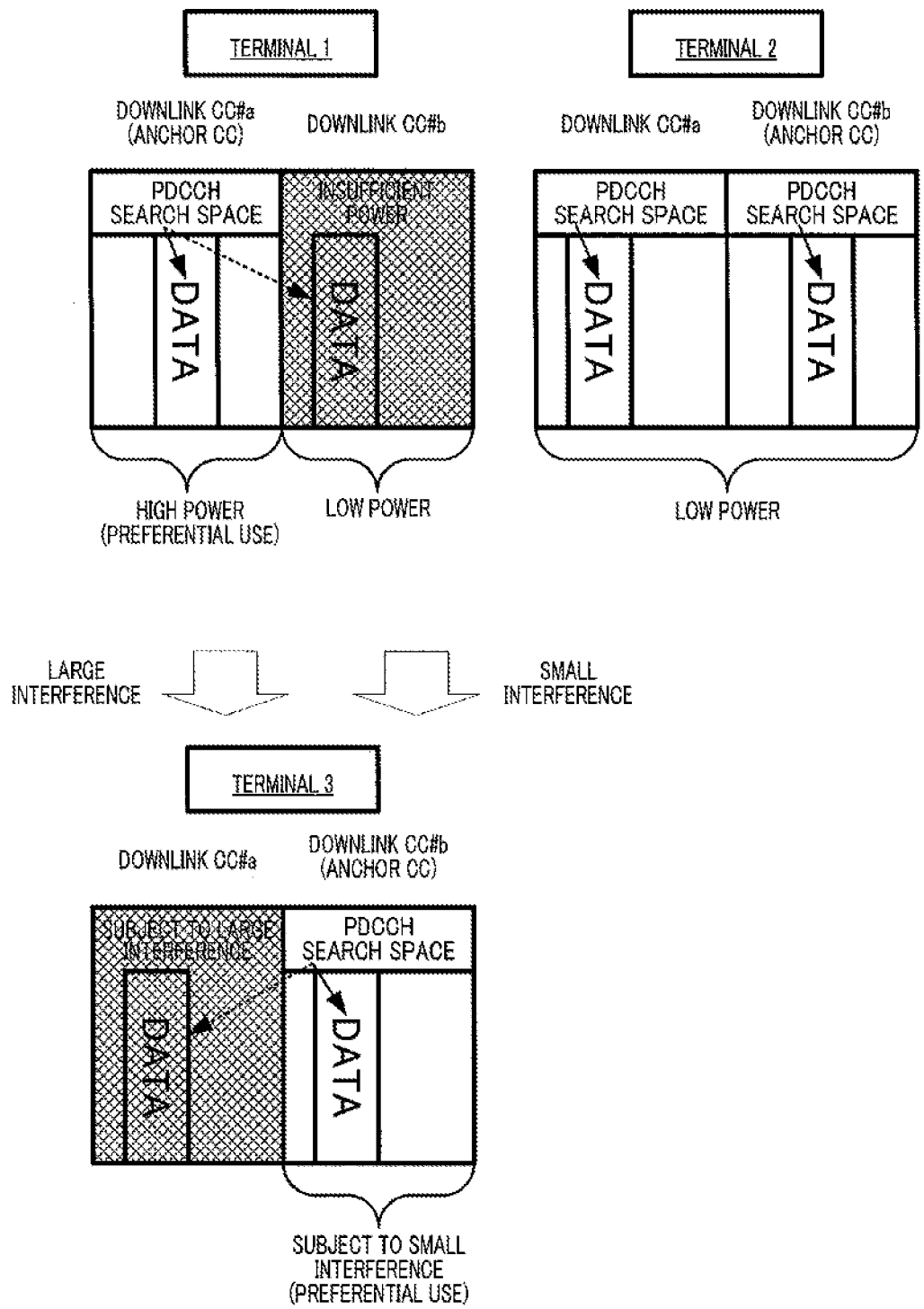
FIG. 13 is a diagram illustrating a typical interference coordination method using CIF in a heterogeneous network.

Effects when using bundling rule 1-3 will be described using FIG. 12 and FIG. 13. FIG. 12 shows a configuration example of a so-called heterogeneous network. In FIG. 12, two downlink unit bands (downlink CC#a and #b) are available to both a macro cell (cell formed by a base station having a large service area (macro base station)) and a femto cell (cell formed by a base station having a small service area (femto base station)). FIG. 13 is a diagram illustrating a typical interference coordination method using a CIF in a so-called heterogeneous network.

In the macro cell, the macro base station controls transmission power of one of the two downlink unit bands (downlink CC#a in the example of FIG. 12) so as to be high and controls transmission power of the other (downlink CC#b in the example of FIG. 12) so as to be low. That is, the macro base station controls transmission power so as to reduce interference from the macro cell with the femto cell in at least one of the two downlink unit bands.

In this case, for a terminal located far from the macro base station and connected to the macro base station (terminal 1 in FIG. 12), it is difficult to transmit downlink assignment control information using a downlink unit band other than downlink CC#a (downlink CC#b in the example of FIG. 12) due to constraints on the coding rate of downlink control information, retransmission control and desired error rate. Here, the downlink assignment control information is downlink control information transmitted through a PDCCH. As for downlink data on the other hand, the downlink data can be transmitted to terminal 1 using downlink CC#b by setting the coding rate to an extremely low level and performing retransmission control. However, a situation in which downlink data is transmitted to terminal 1 using downlink CC#b is not desirable from the perspective of frequency utilization efficiency and CC#b may be more likely to be used only when downlink CC#a is not available under certain circumstances (e.g., a situation in which downlink CC#a is occupied by downlink data addressed to another terminal). That is, downlink data may be more likely to be transmitted to terminal 1 using downlink CC#a (that is, a downlink unit band in which downlink assignment control information for terminal 1 may be arranged).

On the other hand, in the femto cell, the femto base station transmits downlink data to a terminal connected to the femto cell (terminal 3 in the example of FIG. 12) using mainly a downlink unit band having small interference (downlink CC#b in the example of FIG. 12) from the macro cell from the standpoint of transmission efficiency. That is, in the femto cell, downlink data may also be more likely to be transmitted to terminal 3 using a downlink unit band in which downlink assignment control information for terminal 3 may be arranged.

Furthermore, in the case of terminal 2 in FIG. 12 which is arranged near the macro base station, the quality of the downlink unit bands of both downlink CC#a and CC#b is guaranteed. In this case, the downlink assignment control information may be arranged in one or both of the downlink unit bands for terminal 2.

That is, for any terminal 1 to 3, a downlink unit band in which downlink assignment control information may be arranged for a certain terminal may be more likely to be used for transmission of downlink data for the terminal.

The present inventor et al. focused attention on this point. That is, the present inventor et al. focused attention on the fact that there is a correlation between a CIF set to terminal 200 and assignment to a downlink unit band used for downlink data in the actual base station operation (focus point 4).

Thus, as bundling rule 1-3, of downlink unit bands configuring a unit band group, downlink unit bands in which downlink assignment control information may be arranged are associated with different bundling groups. That is, according to bundling rule 1-3, a bundling group is formed such that downlink unit bands in which PDCCH search spaces are set for a certain terminal are preferentially caused to belong to different bundling groups.

This makes it possible to reduce the possibility that a plurality of downlink unit bands in the bundling group may be simultaneously used for transmission of downlink data (realization of downlink unit bands belonging to different bundling groups being simultaneously used with higher priority). Therefore, it is possible to reduce the probability that bundling processing may be actually performed on a response signal from terminal 200 to base station 100.

Thus, by forming a bundling group such that downlink unit bands in which PDCCH search spaces are set for a certain terminal are caused to belong to different bundling groups as much as possible, it is possible to reduce the possibility that a plurality of downlink unit bands in the bundling group may be simultaneously used for transmission of downlink data. Terminal 200 then updates the bundling group table based on bundling rule 1-3 every time a unit band group is set, and can thereby reduce the probability that bundling processing may be actually performed on a response signal from terminal 200 to base station 100 without separately performing signaling related to the bundling group and maintain the efficiency of retransmission control over downlink data while reducing signaling necessary for reporting the bundling group.

As described above, according to the present embodiment, bundling control section 212 generates a bundled ACK/NACK signal obtained by bundling error detection results of downlink unit bands included in the same bundling group based on the bundling rule according to which a bundling group is associated with each of downlink unit bands configuring a unit band group. A transmitting section constructed of uplink control channel signal generating section 213-$k$ ($k=1$ to N), PUCCH multiplexing section 214 and radio transmitting section 215 transmits a bundled ACK/NACK signal arranged on an uplink control channel corresponding to one of the downlink unit bands associated with the same bundling group.

Using above-described bundling rules 1-1 to 1-3, terminal 200 associates each of a plurality of downlink unit bands configuring a unit band group with one bundling group based on frequency positions of a plurality of downlink unit bands and a search space setting situation for a certain terminal or the like, and updates a bundling group table based on the bundling rule every time a unit band group is set. Thus, it is possible to reduce the probability that bundling processing may be actually performed on a response signal from terminal 200 to base station 100 without separately performing signaling related to the bundling group, and maintain the efficiency of retransmission control over downlink data while reducing signaling overhead related to the bundling group.

Embodiment 2

Giving priority to the efficiency of downlink retransmission control, Embodiment 1 forms a bundling group such that the terminal preferentially performs multi-code transmission (that is, bundling processing is prevented as much as possible), in contrast, the present embodiment attaches importance to transmission-related power consumption efficiency of a terminal, frequently uses bundling processing with high priority and forms a bundling group such that chances that multi-code transmission may be performed are consequently reduced (that is, such that single carrier transmission is frequently used with high priority).

Configurations of a base station and a terminal according to the present embodiment are similar to those of base station 100 and terminal 200 according to Embodiment 1 shown in FIG. 7 and FIG. 8 and only bundling rules are different, and therefore illustrations with drawings will be omitted and bundling rules will be mainly described using FIG. 7 and FIG. 8.

[Bundling Rule]

A bundling rule according to which a bundling group is associated with each of downlink unit bands configuring a unit band group will be described below.

A case will be described below as an example where five downlink unit bands #a to #e (downlink CC#a to #c) are set for terminal 200 as downlink unit bands configuring a unit band group.

Figures 14A, 14B:
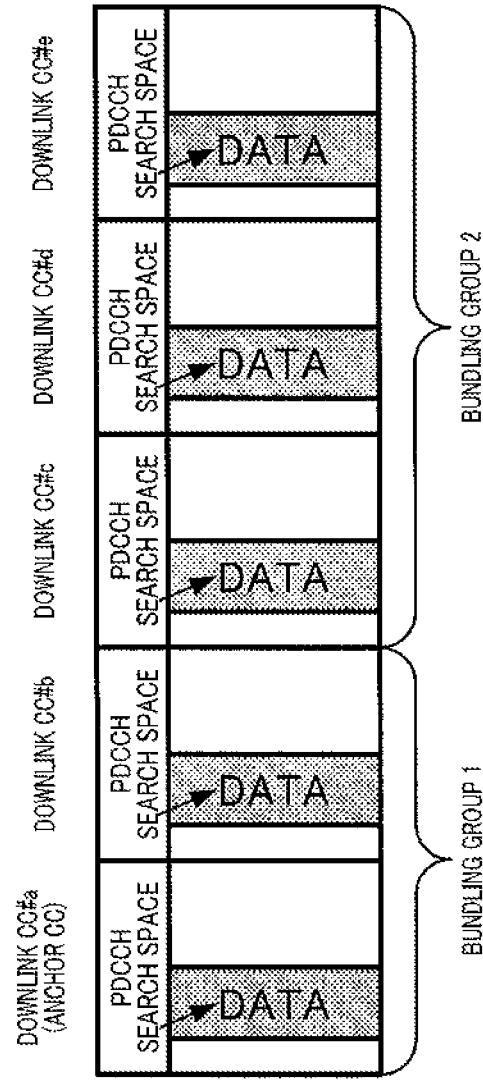
FIG. 14 is a diagram illustrating bundling rule 2-1 according to Embodiment 2 of the present invention.

[Bundling Rule 2-1] (See FIG. 14)

FIG. 14 is a diagram illustrating bundling rule 2-1. According to bundling rule 2-1, downlink unit bands included in at least one of pairs of downlink unit bands neighboring each other on the frequency axis out of five downlink unit bands configuring a unit band group are associated with the same bundling group.

In the example shown in FIG. 14, both downlink CC#a and #b neighboring each other on the frequency axis are associated with bundling group 1. On the other hand, downlink CC#c, #d and #e neighboring each other on the frequency axis are all associated with bundling group 2.

Thus, bundling group 1 is formed of downlink CC#a and #b neighboring each other on the frequency axis. Similarly, bundling group 2 is formed of downlink CC#c, #d and #e neighboring each other on the frequency axis.

Here, when base station 100 activates a plurality of downlink unit bands for terminal 200, base station 100 may be more likely to preferentially activate downlink unit bands neighboring each other on the frequency axis (located at a short distance from each other on the frequency axis) in consideration of the reception-related power consumption efficiency of terminal 200. That is, a pair of downlink unit bands neighboring each other on the frequency axis are more likely to be simultaneously used for transmission of downlink data than a pair of downlink unit bands not neighboring each other on the frequency axis, in other words, a pair of downlink unit bands neighboring each other on the frequency axis are more likely to be simultaneously set to active downlink unit bands.

The present inventor et al. focused attention on this point as in the case of bundling rule 1-1. That is, the present inventor et. al. focused attention on the fact that with regard to activation for each downlink, unit band, operation of simultaneously activating downlink unit bands neighboring each other on the frequency axis is preferable for reception-related power consumption efficiency of terminal 200 (focus point 1). Furthermore, the present inventor et al, focused attention on the fact that when partial bundling is applied to terminal 200, a plurality of downlink unit bands in the bundling group are preferably used (activated) simultaneously for transmission of downlink data from the standpoint of transmission-related power consumption efficiency of terminal 200 (focus point 5). The present inventor et al. considered that it would be possible to improve the transmission-related power consumption efficiency of terminal 200 while reducing signaling necessary for reporting the bundling group by associating the method of forming the bundling group with physical frequency positions.

Thus, as bundling rule 2-1, of the five downlink unit bands configuring the unit band group, downlink unit bands included in at least one of pairs of downlink unit bands neighboring each other on the frequency axis are associated with the same bundling group (bundling rule 2-1). That is, according to bundling rule 2-1, a bundling group is formed such that downlink unit bands neighboring each other on the frequency axis which are more likely to be simultaneously set to active downlink unit bands belong to the same bundling group.

Thus, when a bundling group table based on bundling rule 2-1 (see FIG. 14B) is used, downlink unit bands neighboring each other on the frequency axis are preferentially sorted to the same bundling group. Therefore, when base station 100 activates downlink unit bands neighboring each other on the frequency axis for terminal 200 as active downlink unit bands, it is possible to reduce the probability that multi-code transmission may be applied to a response signal from terminal 200 to base station 100.

Thus, by forming a bundling group such that downlink unit bands neighboring each other on the frequency axis are caused to belong to the same bundling group, it is possible to reduce the possibility that a plurality of downlink unit bands in different bundling groups may be simultaneously used for transmission of downlink data. That is, since it is possible to reduce the probability that multi-code transmission may be applied to a response signal from terminal 200 to base station 100, the chances that single carrier transmission may be performed will increase and it is possible to reduce increases in a PAPR. Every time a unit band group is set, terminal 200 updates the bundling group table based on bundling rule 2-1, and can thereby reduce the probability that multi-code transmission may be applied to a response signal from terminal 200 to base station 100 without separately performing signaling related to the bundling group, and improve the transmission-related power consumption efficiency of terminal 200 while reducing signaling necessary for reporting the bundling group.

Figures 15A, 15B:
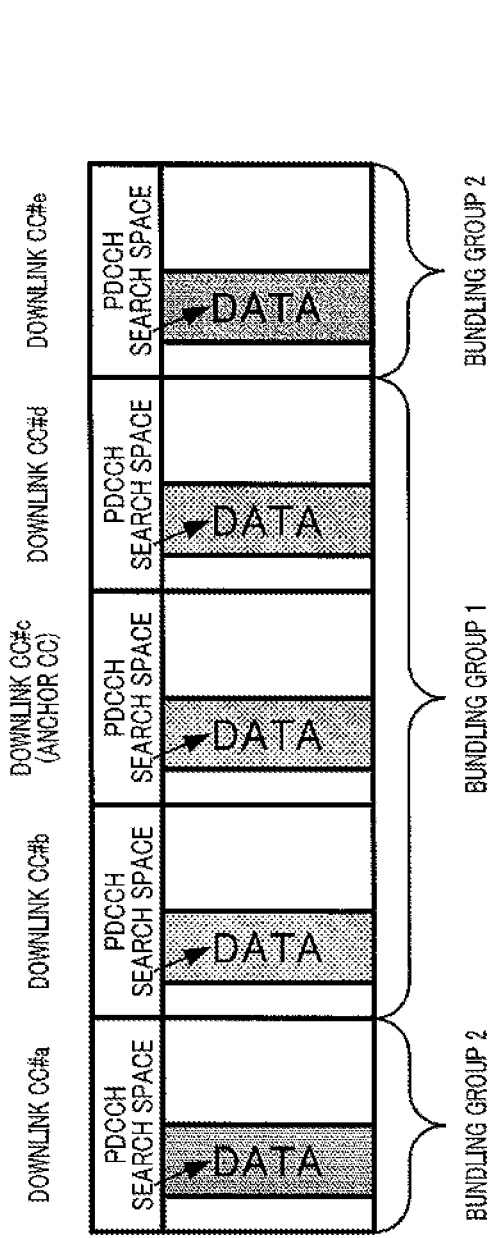
FIG. 15 is a diagram illustrating bundling rule 2-2 according to Embodiment 2.

[Bundling Rule 2-2] (See FIG. 15)

FIG. 15 is a diagram illustrating bundling rule 2-2. According to bundling rule 2-2, of downlink unit bands set for the terminal, an anchor downlink unit band (PCC) which is always activated, and downlink unit bands neighboring the anchor CC on the frequency axis are associated with the same bundling group. That is a bundling group is formed such that downlink unit bands neighboring the anchor CC on the frequency axis (or located at the shortest distance from the anchor CC on the frequency axis) are caused to belong to the same bundling group as that of the anchor CC.

The example shown in FIG. 15 is an example of a ease where downlink CC#c is an anchor CC which is always activated and when downlink CC#c is associated with bundling group 1, downlink CC#b and #d neighboring downlink CC#c on the frequency axis are associated with bundling group 1.

As described above, when base station 100 activates a plurality of downlink unit bands for terminal 200, base station 100 is more likely to preferentially activate downlink unit bands neighboring each other on the frequency axis (located at a shorter distance from each other on the frequency axis) in consideration of reception-related power consumption efficiency of terminal 200. That is, base station 100 is more likely to preferentially activate downlink unit bands neighboring an anchor CC on the frequency axis (located at a shorter distance from the anchor CC on the frequency axis) as active downlink unit bands.

The present inventor et al. focused attention on this point in addition to focus points 1 and 5 described in bundling rule 2-1. That is, of the plurality of downlink unit bands included in a unit band group set for terminal 200, the present inventor et al, focused attention on the fact that one downlink unit band is always activated as an anchor CC (focus point 3).

The present inventor et al, not only associates the method of forming a bundling group with absolute frequency positions but also associates the method with the correlation with anchor CC, and thereby considers that it is possible to improve transmission-related power consumption efficiency of terminal 200 while reducing signaling necessary for reporting the bundling group.

Thus, as bundling rule 3-2, of downlink unit bands set for the terminal, an anchor CC which is always activated and downlink unit bands neighboring the anchor CC on the frequency axis are associated with the same bundling group (bundling rule 2-2). That is, according to bundling rule 2-2, a bundling group is formed such that downlink unit bands neighboring the anchor CC on the frequency axis, that are more likely to be simultaneously set to active downlink unit bands belong to the same bundling group as that of the anchor CC.

Thus, when a bundling group table according to bundling rule 2-2 (see FIG. 15B) is used, downlink unit bands neighboring the anchor CC which is always activated on the frequency axis are sorted to the same bundling group. Therefore, when base station 100 preferentially activates downlink unit bands neighboring each other on the frequency axis as active downlink unit bands for terminal 200, it is possible to reduce the probability that multi-code transmission may be applied to a response signal from terminal 200 to base station 100.

Thus, by forming a bundling group such that downlink unit bands neighboring the anchor CC which is always activated on the frequency axis are caused to belong to the same bundling group, it is possible to reduce the possibility that a plurality of downlink unit bands in different bundling groups may be simultaneously used for transmission of downlink data. That is, since the probability that multi-code transmission may be applied to a response signal from terminal 200 to base station 100 can be reduced, chances that single carrier transmission may be performed are increased and increases in a PAPR can be suppressed. Every time a unit band group is set, terminal 200 updates the bundling group table based on bundling rule 2-2, and can thereby reduce the probability that multi-code transmission may be applied to a response signal from terminal 200 to base station 100 without separately performing signaling related to the bundling group and improve the transmission-related power consumption efficiency of terminal 200 while reducing signaling necessary for reporting the bundling group.

[Bundling Rule 2-3] (See FIG. 16)

FIG. 16 is a diagram illustrating bundling rule 2-3. According to bundling rule 2-3, of downlink unit bands configuring a unit band group, downlink unit bands in which downlink assignment control information may be arranged are associated with the same bundling group. Here, the "downlink unit bands in which downlink assignment control information may be arranged" are downlink unit bands for which terminal 200 makes a blind, decision on downlink assignment control information and may be expressed in the LTE-A system as "downlink unit bands in which search spaces of downlink control information are set" for the terminal.

That is, according to bundling rule 2-3, a bundling group is formed such that downlink unit bands in which PDCCH search spaces for terminal 200 are set are preferentially caused to belong to the same bundling group. For example, in examples shown in FIG. 16A and FIG. 16B, all of three downlink unit bands in which PDCCH search spaces are set for a certain terminal are associated with bundling group 1. On the other hand, in examples shown in FIG. 16C and FIG. 16D, both of two downlink unit bands in which PDCCH search spaces are set are associated with bundling group 1.

The present inventor et al, focused attention on the fact that there is a correlation between a CIF set for terminal 200 and assignment to downlink unit bands used for downlink data in the actual base station operation as in the case of bundling rule 1-3 (focus point 4).

Thus, as bundling rule 2-3, of downlink unit bands configuring a unit band group, downlink unit bands in which downlink assignment control information may be arranged are associated with the same bundling group (bundling rule 2-3). That is, according to bundling rule 2-3, a bundling group is formed such that downlink unit bands in which PDCCH search spaces are set for a certain terminal preferentially belong to the same bundling group.

This makes it possible to reduce the possibility that plurality of downlink unit bands in different bundling groups may be used simultaneously for transmission of downlink data (realization of downlink unit bands belonging to the same bundling group being simultaneously used with higher priority). Therefore, it is possible to reduce the probability that multi-code transmission may be applied to a response signal from terminal 200 to base station 100.

Thus, by forming a bundling group such that downlink unit bands in which PDCCH search spaces are set for a certain terminal are caused to belong to the same bundling group as much as possible, it is possible to reduce the possibility that a plurality of downlink unit bands in different bundling groups may be simultaneously used for transmission of downlink data. That is, since the probability that multi-code transmission may be applied to a response signal from terminal 200 to base station 100 can be reduced, chances that single carrier transmission may be performed increase and increases in a PAPR can be suppressed. Terminal 200 updates the bundling group table based on bundling rule 2-3 every time a unit band group is set, and can thereby reduce the probability that multi-code transmission may be applied to a response signal from terminal 200 to base station 100 without separately performing signaling related to the bundling group and improve the transmission-related power consumption efficiency of terminal 200 while reducing signaling necessary for reporting the bundling group.

As described above, according to the present embodiment, bundling control section 212 as the generating section that generates a response signal generates a bundled ACK/NACK signal obtained by bundling error detection results of downlink unit bands included in the same bundling group based on a bundling rule according to which a bundling group is associated with each downlink unit band configuring a unit band group. A transmitting section constructed of uplink control channel signal generating section 213-*k* (k=1 to N), PUCCH multiplexing section 214 and radio transmitting section 215 transmits the bundled ACK/NACK signal arranged on an uplink control channel corresponding to one of the downlink unit bands associated with the same bundling group.

Terminal 200 associates each of the plurality of downlink unit bands configuring a unit band group with one bundling group using above bundling rules 2-1 to 2-3 based on frequency positions of a plurality of downlink unit bands and search space setting situation for a certain terminal or the like, and updates the bundling group table based on the bundling rule every time a unit band group is set. This makes it possible to reduce the probability that multi-code transmission may be applied to a response signal from terminal 200 to base station 100 without separately performing signaling related to the bundling group and improve the transmission-related power consumption efficiency of terminal 200 while reducing signaling overhead related to the bundling group.

Embodiment 3

The present embodiment differs from Embodiments 1 and 2 in that a base station switches a bundling rule (that is, a method of forming a bundling group) from one terminal to another.

Configurations of a base station and a terminal according to the present embodiment are the same as the eon figurations of base station 100 and terminal 200 according to Embodiment 1 shown in FIG. 7 and FIG. 8, and are only different in that the bundling rule is switched, and therefore description thereof will be omitted and the switching between bundling rules will be mainly described using FIG. 7 and FIG. 8.

[Switching of Bundling Rule]

Base station 100 according to the present embodiment reports which of bundling rules 1-1 to 1-3 based on "(1) preference of downlink data retransmission control efficiency" or bundling rules 2-1 to 2-3 based on "(2) preference of transmission-related power consumption efficiency of terminal 200" is used for each terminal 200 as a bundling rule (a method of forming a bundling group).

As described above, bundling rules 1-1, 1-2 and 1-3 in Embodiment 1 are preferable when priority is given to downlink data retransmission control efficiency. On the other hand, bundling rules 2-1, 2-2 and 2-3 in Embodiment 2 are preferable when priority is given to transmission-related power consumption efficiency of terminal 200.

Base station 100 then instructs a plurality of terminals 200 located at a short distance from base station 100 to use a method of forming a bundling group shown in one of bundling rules 1-1, 1-2 and 1-3 as a bundling rule. This allows terminal 200 located near the center of a cell to improve the downlink data retransmission control efficiency.

On the other hand, base station 100 instructs a plurality of terminals 200 located at a long distance from base station 100 to use a method of forming a bundling group shown in one of bundling rules 2-1, 2-2 and 2-3 as a bundling rule. This allows terminal 200 located at a cell edge which has more transmission-related power consumption to suppress deterioration of the power consumption efficiency.

Thus, base station 100 and terminal 200 switch between bundling rules according to the distance between base station 100 and terminal 200, thus allowing terminal 200 located at the center of the cell to improve the downlink data retransmission control efficiency and allowing terminal 200 located at a cell edge which has more transmission-related power consumption to suppress deterioration of power consumption efficiency. That is, it is possible to make the transmission-related power consumption efficiency of the terminal compatible with the downlink data retransmission control efficiency in a well-balanced way in the cell as a whole.

A ease has been described above where a ZAC sequence is used for primary spreading and a blockwise spread code sequence is used for secondary spreading. However, sequences other than the ZAC sequence which are separable from each other by different amounts of cyclic shift may also be used for primary spreading. For example, GCL (Generalized Chirp like) sequence, CAZAC (Constant Amplitude Zero Auto Correlation) sequence, ZC (Zadoff-Chu) sequence, PN sequence such as M sequence and orthogonal gold code sequence or a sequence randomly generated by a computer and having a steep auto-correlation characteristic on the time axis or the like may be used for primary spreading. Furthermore, any sequences which are orthogonal to each other or which can be regarded as substantially orthogonal to each other may be used as blockwise spread code sequences for secondary spreading. For example, a Walsh sequence or Fourier sequence or the like may be used as a blockwise spread code sequence for secondary spreading. In the above description, resources for a response signal (e.g., PUCCH resources) are defined by an amount of cyclic shift of a ZAC sequence and a sequence number of a blockwise spread code sequence.

Furthermore, a sequence used for primary spreading may be called a "base sequence" in the sense that it is a fundamental sequence for generating a sequence corresponding to each amount of cyclic shift. For example, LTE applies cyclic shift processing to a base sequence having a sequence length of 12 defined on the frequency axis to thereby generate a sequence (that is a sequence used for primary spreading) corresponding to each amount of cyclic shift.

Furthermore, a case has been described above where as the processing order on the terminal side, IFFT conversion is performed after primary spreading and secondary spreading. However, the processing order is not limited to this. An equivalent result may be obtained no matter where the secondary spreading processing is placed as long as the IFFT processing is performed after the primary spreading processing.

Furthermore, the above embodiments have been described with the example in which the present invention is implemented by hardware, however, the present invention may also be implemented by software in connection with hardware.

The functional blocks used for description of the above embodiments are typically implemented as large scale integration (LSI) which is an integrated circuit (IC). The functional blocks may be individually implemented as one chip, or some or all of the functional blocks may be implemented as one chip. "LSI" is adopted here but this may also be referred to as "IC," "system LSI," "super LSI" or "ultra LSI" depending on a difference in integration.

A circuit integration technique is not limited to the LSI, and implementation by a dedicated circuit or a general purpose processor may be adopted. After LSI manufacture, a field programmable gate array (FPGA) which is programmable or a reconfigurable processor in which connections and settings of circuit cells within an LSI can be reconfigured may be used.

Furthermore, if a circuit integration technique of replacing the LSI by another technique advanced or derived from a semiconductor technology appears, the functional blocks may be naturally integrated using the technique. There may be a possibility that a biotechnology will be applied.

The disclosure of Japanese Patent Application No. 2010-087088, filed on Apr. 5, 2010, including the specification, drawings and abstract, is incorporated herein by reference in its entirety.

INDUSTRIAL APPLICABILITY

The present invention is applicable to a mobile communication system or the like.

REFERENCE SIGNS LIST 100 base station
101, 208 control section
102 control information generating section
103 coding section
104, 107, 221 modulating section
105 Coding section
106 data transmission control section
108 mapping section
109, 223, 226 IFFT section
110, 224, 227 CP adding section
111, 215 radio transmitting section
112, 201 radio receiving section
113, 202 CP removing section
114 PUCCH extracting section
115 despreading section
116 sequence control section
117 correlation processing section
118, 207 deciding section
119 retransmission control signal generating section
200 terminal
203 FFT section
204 extracting section
205, 209 demodulating section
206, 210 decoding section
211 CRC section
212 bundling control section
213-1 to 213-N uplink control channel signal generating section
214 PUCCH multiplexing section
222, 225, 228 spreading section
229 multiplexing section

The invention claimed is:

1. A terminal device comprising:
a receiving section that receives downlink data transmitted using at least one downlink unit band in a unit band group made up of a plurality of downlink unit bands;
a table in which each of the downlink unit bands constituting the unit band group is associated with any one of a plurality of bundling groups based on a bundling rule;
a generating section that generates a response signal obtained by bundling error detection results of the downlink unit bands included in the same bundling group; and
a transmitting section that transmits the response signal arranged on an uplink control channel corresponding to one of the downlink unit bands associated with the same bundling group, wherein
the table is updated based on the bundling rule every time the unit band group is set,
the bundling rule is switched from one terminal to another terminal, and
the bundling rule is switched according to a distance between a base station and the terminal device.

2. The terminal device according to claim 1, wherein according to the bundling rule, the respective downlink unit bands are associated with the bundling group based on frequency positions of the downlink unit bands.

3. The terminal device according to claim 1, wherein according to the bundling rule, out of the downlink unit bands, downlink unit bands which are more likely to be simultaneously used are associated with different bundling groups.

4. The terminal device according to claim 1, wherein according to the bundling rule, out of the downlink unit bands configuring the unit band group, downlink unit bands neighboring each other on the frequency axis are associated with different bundling groups.

5. The terminal device according to claim 1, wherein according to the bundling rule, out of the downlink unit bands, a specific downlink unit band and a downlink unit band neighboring the specific downlink unit band on the frequency axis are associated with different bundling groups.

6. The terminal device according to claim 1, wherein according to the bundling rule, out of the downlink unit bands, downlink unit bands in which downlink assignment control information is more likely to be arranged are associated with different bundling groups.

7. The terminal device according to claim 1, wherein according to the bundling rule, out of the downlink unit bands, downlink unit bands which are more likely to be simultaneously used are associated with the same bundling group.

8. The terminal device according to claim 1, wherein according to the bundling rule, out of the downlink unit bands, downlink unit bands neighboring each other on the frequency axis are associated with the same bundling group.

9. The terminal device according to claim 1, wherein according to the bundling rule, out of the downlink unit bands, a specific downlink unit band and a downlink unit bands neighboring the specific downlink unit band on the frequency axis are associated with the same bundling group.

10. The terminal device according to claim 1, wherein according to the bundling rule, out of the downlink unit bands, downlink unit bands in which downlink assignment control information is more likely to be arranged are associated with the same bundling group.

* * * * *